United States Patent
Boettcher et al.

(10) Patent No.: US 11,945,508 B2
(45) Date of Patent: Apr. 2, 2024

(54) VEHICLE FRAME REINFORCEMENT STRUCTURE

(71) Applicant: Honda Motor Co., Ltd., Tokyo (JP)

(72) Inventors: Eric J. Boettcher, Columbus, OH (US); Mario Miranda Espinosa, Mexico City (MX); Vijay Maccha, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 13 days.

(21) Appl. No.: 17/859,396

(22) Filed: Jul. 7, 2022

(65) Prior Publication Data

US 2023/0011721 A1 Jan. 12, 2023

Related U.S. Application Data

(60) Provisional application No. 63/219,549, filed on Jul. 8, 2021.

(51) Int. Cl.
*B62D 25/04* (2006.01)
*B62D 25/02* (2006.01)
*B60J 5/04* (2006.01)

(52) U.S. Cl.
CPC .......... *B62D 25/04* (2013.01); *B62D 25/025* (2013.01); *B60J 5/0447* (2013.01)

(58) Field of Classification Search
CPC ...... B62D 25/04; B62D 25/025; B62D 25/02; B62D 21/157

USPC .......... 296/193.06, 209, 23.01, 2, 3, 187.09, 296/187.1, 187.12
See application file for complete search history.

(56) References Cited

U.S. PATENT DOCUMENTS

| | | | |
|---|---|---|---|
| 9,718,500 B2 * | 8/2017 | Lee | B62D 29/00 |
| 9,738,322 B2 * | 8/2017 | Matthiessen | B62D 29/043 |
| 9,988,095 B2 * | 6/2018 | Maier | B62D 21/15 |
| 10,913,500 B2 * | 2/2021 | Donabedian | B62D 21/02 |
| 2012/0181815 A1 * | 7/2012 | Gentsch | B62D 25/04 |
| | | | 29/897.2 |
| 2016/0229456 A1 * | 8/2016 | Boettcher | B62D 27/026 |
| 2016/0229457 A1 | 8/2016 | Boettcher | |
| 2017/0029040 A1 | 2/2017 | Meaige et al. | |

FOREIGN PATENT DOCUMENTS

DE 102013114114 A1 * 7/2015 ........... B62D 25/025

\* cited by examiner

*Primary Examiner* — Dennis H Pedder
(74) *Attorney, Agent, or Firm* — RANKIN, HILL & CLARK LLP

(57) ABSTRACT

A vehicle frame includes a first beam with a first wall and a second wall extended in a first beam longitudinal direction, wherein the first wall and the second wall are spaced from each other in a first beam transverse direction substantially perpendicular to the first beam longitudinal direction. The first beam includes at least one first beam reinforcement structure, the at least one first beam reinforcement structure including a first leg and a second leg disposed along the first beam and extended between the first wall and the second wall in the first beam transverse direction. The first leg and the second leg are angled toward each other along the first beam transverse direction from the second wall toward the first wall.

18 Claims, 16 Drawing Sheets

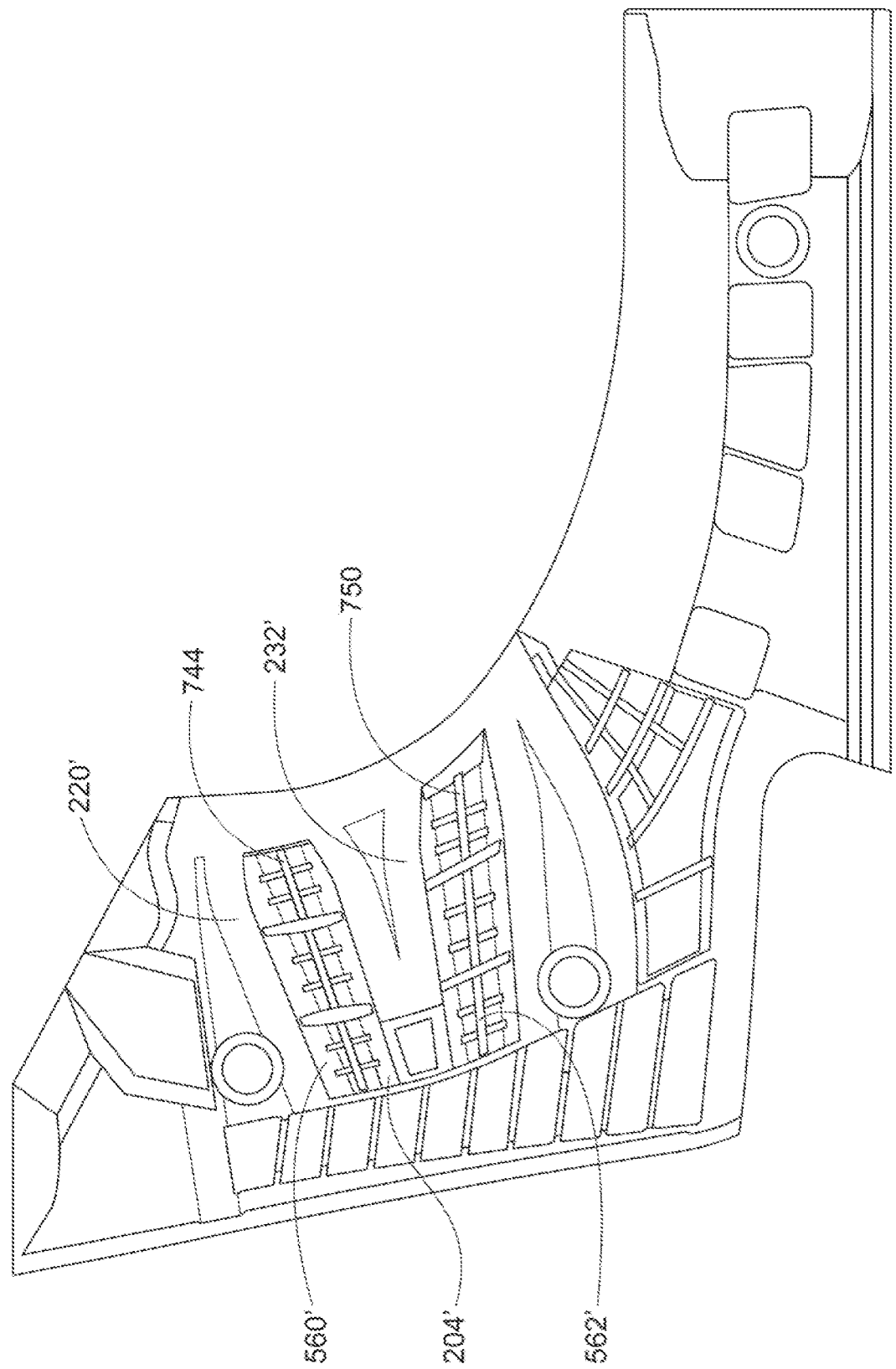

VEHICLE FRAME REINFORCEMENT STRUCTURE

BACKGROUND

Vehicle frames and constructions therefor are increasingly complex as vehicle manufacturers look for new ways to improve structural integrity of the vehicle frame while maintaining and/or reducing the overall weight of the vehicle frame. These are often competing concerns. That is, increasing the structural integrity of the vehicle frame, including improving crash performance characteristics, often involves adding weight to the vehicle frame. Conversely, reducing the weight of the vehicle frame must be done carefully so as to avoid adversely changing the structural integrity of the vehicle frame. As such, there is continued interest in reinforcing members in vehicle frames which provide increased structural integrity of the vehicle frame, including improved crash performance characteristics, while maintaining or reducing an overall weight of the vehicle frame.

BRIEF DESCRIPTION

According to one aspect, a vehicle frame includes a first beam with a first wall and a second wall extended in a first beam longitudinal direction, wherein the first wall and the second wall are spaced from each other in a first beam transverse direction substantially perpendicular to the first beam longitudinal direction. The first beam includes at least one first beam reinforcement structure, the at least one first beam reinforcement structure including a first leg and a second leg disposed along the first beam and extended between the first wall and the second wall in the first beam transverse direction. The first leg and the second leg are angled toward each other along the first beam transverse direction from the second wall toward the first wall.

According to another aspect, a vehicle frame includes an A-pillar. The A-pillar includes a first wall and a second wall extended in a vehicle height direction and spaced from each other such that the first wall is positioned in front of the second wall in a vehicle longitudinal direction. The A-pillar includes a first beam reinforcement structure positioned at the first wall and the second wall, the first beam reinforcement structure including a first leg and a second leg disposed along the A-pillar between the first wall and the second wall in the vehicle longitudinal direction. The first leg and the second leg of the first beam reinforcement structure are angled toward each other along the vehicle longitudinal direction from the second wall toward the first wall of the A-pillar.

According to another aspect, a vehicle frame includes a beam with a first wall and a second wall extended in a beam longitudinal direction. The first wall and the second wall are spaced from each other in a beam transverse direction substantially perpendicular to the beam longitudinal direction. The beam includes a reinforcement structure with at least one leg formed from a first incline portion and a second incline portion disposed along the beam, between the first wall and the second wall in the beam transverse direction. The first incline portion and the second incline portion define a channel extended along the at least one leg in the beam transverse direction.

BRIEF DESCRIPTION OF THE DRAWINGS

FIG. 21 is a partial outer side view of second A-pillar section and a side sill included in the portion of the vehicle frame of FIG. 16.

DETAILED DESCRIPTION

It should, of course, be understood that the description and drawings herein are merely illustrative and that various modifications and changes can be made in the structures disclosed without departing from the present disclosure. Spatially relative terms are used to describe an element and/or feature's relationship to another element(s) and/or feature(s) as, for example, illustrated in the figures. Moreover, any term of degree used herein, such as "substantially" and "approximately", means a reasonable amount of deviation of the modified word is contemplated such that the end result is not significantly changed.

Figure 1:
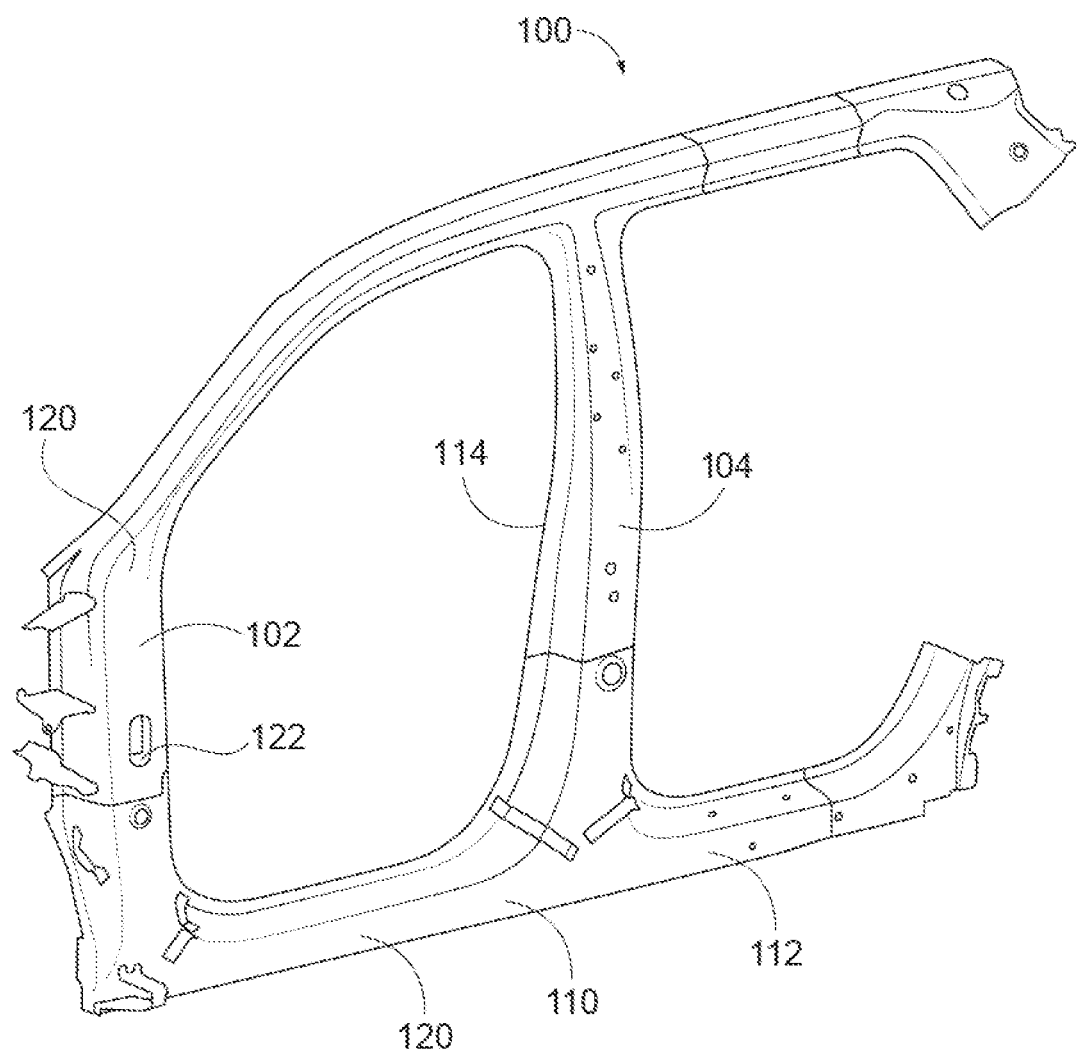
FIG. 1 is a perspective view of a portion of a vehicle frame.
Figure 2:
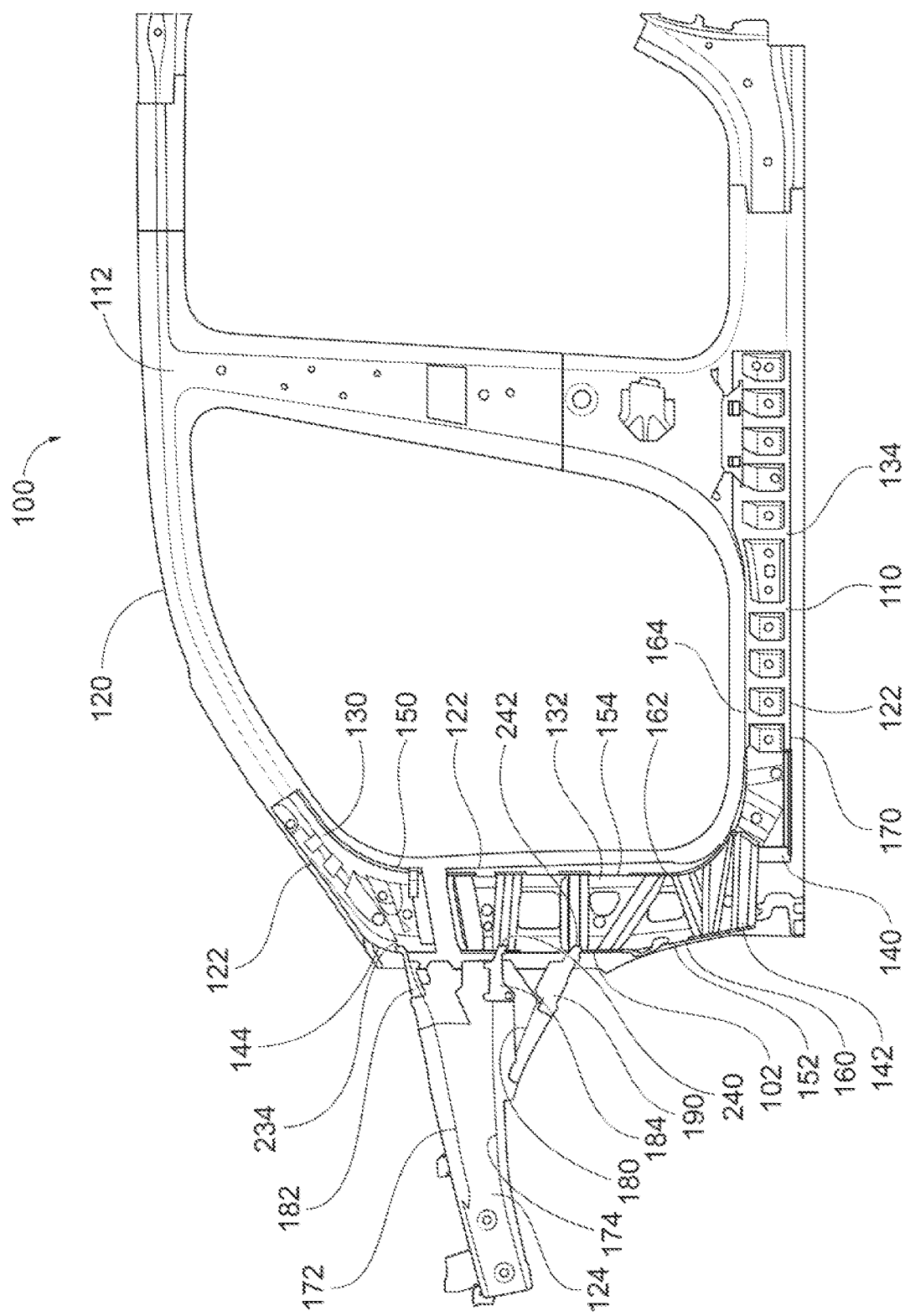
FIG. 2 is a side view of the portion of the vehicle frame.

Referring now to the drawings, where like numerals refer to like parts throughout the several views, FIGS. 1 and 2 depicts a left side portion of a vehicle frame 100 for an automotive vehicle. The vehicle frame 100 includes an A-pillar 102, a B-pillar 104, and a side sill 110 as beams fixed with each other in a rigid structure having an outer side 112 and an oppositely facing inner side 114. The vehicle frame 100 is formed from a plurality of interconnected panels 120 with reinforcing members 122, shown in FIG. 2, disposed therein. FIG. 2 depicts the vehicle frame 100 with the panels 120 removed from the outer side 112 of the frame 100, and including a wheel apron 124. The wheel apron 124 forms a beam fixed with the A-pillar 102 in the vehicle frame 100. The apron 124 extends in an apron longitudinal direction substantially parallel to a vehicle longitudinal direction.

The reinforcing members 122 include a first A-pillar section 130 and a second A-pillar section 132 fixed in the vehicle frame 100 as portions of the A-pillar 102. The reinforcing members 122 also include a side sill reinforcing member 134 having a side sill end portion 140 fixed with the A-pillar 102 at a bottom end portion 142 of the second A-pillar section 132.

The first A-pillar section 130 includes a first wall 144 and a second wall 150 extended in a first beam longitudinal direction substantially along a vehicle height direction. The first wall 144 and the second wall 150 of the first A-pillar section 130 are spaced from each other such that the first wall 144 is positioned in front of the second wall 150 in a first beam transverse direction that is substantially parallel to the vehicle longitudinal direction, and substantially perpendicular to the first beam longitudinal direction. The second A-pillar section 132 includes a first wall 152 and a second wall 154 extended in the first beam longitudinal direction. The first wall 152 and the second wall 154 of the second A-pillar section 132 are spaced from each other such that the first wall 152 is positioned in front of the second wall 154 in the first beam transverse direction. The first wall 144 of the first A-pillar section 130 and the first wall 152 of the second A-pillar section 132 are approximately collinear and collectively referred to herein as the first wall 160 of the A-pillar 102. The second wall 150 of the first A-pillar section 130 and the second wall 154 of the second A-pillar section 132 are approximately collinear and collectively referred to herein as the second wall 162 of the A-pillar 102.

With continued reference to FIG. 2, the side sill 110 includes a first wall 164 and a second wall 170 extended in a side sill longitudinal direction substantially parallel with the vehicle longitudinal direction, and substantially perpendicular to the first beam longitudinal direction. The first wall 164 and the second wall 170 of the side sill 110 are spaced from each other such that the first wall 164 is positioned above the second wall 170 in a side sill transverse direction substantially perpendicular to the side sill longitudinal direction, and substantially parallel with the vehicle height direction.

The wheel apron 124 is configured for housing a wheel assembly of an automotive vehicle with the A-pillar 102 and the side sill 110 positioned behind the wheel in the vehicle longitudinal direction. The wheel assembly may include a wheel, an axle, a braking system, a suspension system, and other components configured for supporting and operating the wheel with respect to the vehicle frame 100. The wheel apron 124 is fixed with the A-pillar 102 at the first A-pillar section 130 and the second A-pillar section 132, and extended substantially in the vehicle longitudinal direction for transferring a load from a forward portion of the vehicle frame 100 backward in the vehicle longitudinal direction, into the A-pillar 102.

In the depicted aspect, the wheel apron 124 includes a first shear wall 172, a second shear wall 174, and a third shear wall 180 extended along the first beam transverse direction, and configured for transferring a load through the wheel apron 124 to the A-pillar 102 in the first beam transverse direction. With this configuration of the wheel apron 124, the vehicle frame 100 includes a first bulkhead 182, a second bulkhead 184, and a third bulkhead 190 that, respectively, directly connect the first shear wall 172, the second shear wall 174, and the third shear wall 180 to the first wall 160 of the A-pillar 102. As such, the first shear wall 172, the second shear wall 174, and the third shear wall 180 are respectively configured to transfer a load through the wheel apron 124 and to the first bulkhead 182, the second bulkhead 184, and the third bulkhead 190, where the load is further transferred to the first wall 160 of the A-pillar 102.

Figure 3:
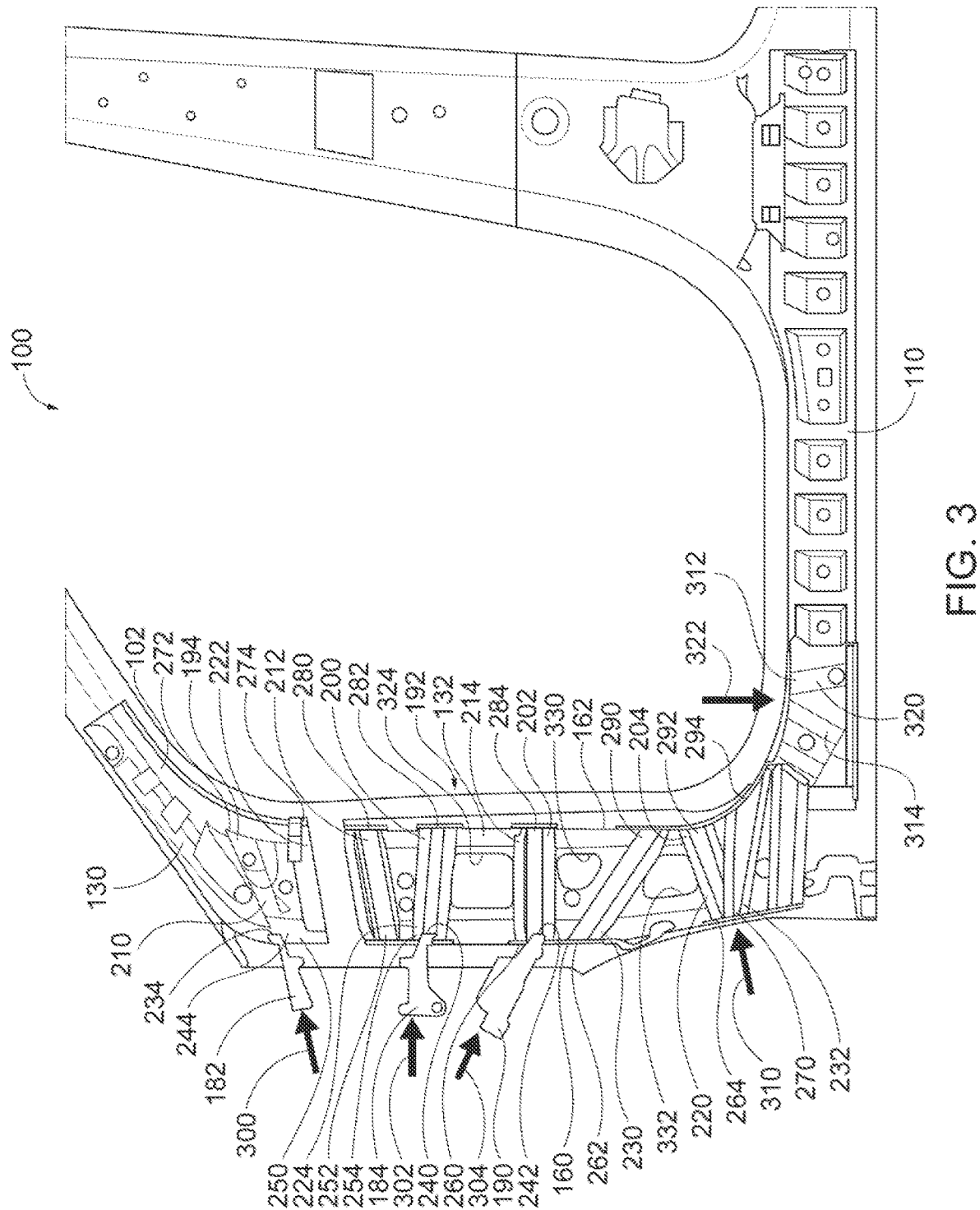
FIG. 3 is a partial, enlarged side view of the portion of the vehicle frame.

As shown in FIG. 3, the A-pillar 102 includes a plurality of first beam reinforcement structures 192, where the first A-pillar section 130 includes a first reinforcement structure 194, and the second A-pillar section 132 includes a second reinforcement structure 200, a third reinforcement structure 202, and a fourth reinforcement structure 204. Each reinforcement structure 194, 200, 202, 204 in the plurality of first beam reinforcement structures 192 includes a first strengthening rib or leg 210, 212, 214, 220 and a second strengthening rib or leg 222, 224, 230, 232 disposed along the A-pillar 102. Each first leg 210, 212, 214, 220, and each second leg 222, 224, 230, 232 extend between the first wall 160 and the second wall 162 of the A-pillar 102 in the first beam transverse direction from the first wall 160 to the second wall 162.

The first leg 210, 212, 214, 220 and the second leg 222, 224, 230, 232 of each same reinforcement structure 194, 200, 202, 204 are angled toward each other along the first beam transverse direction taken from the second wall 162 toward the first wall 160 of the A-pillar 102. The first leg 210, 212, 214, 220 and the second leg 222, 224, 230, 232 in each same reinforcement structure 194, 200, 202, 204 are linear and at least partially define a triangle shape in the A-pillar 102 between the first leg 210, 212, 214, 220, the second leg 222, 224, 230, 232, and the second wall 162.

In the first reinforcement structure 194 and the fourth reinforcement structure 204, the first leg 210, 220 and the second leg 222, 232, in respective pairs, are spaced from each other in the first beam longitudinal direction and angled toward each other along the first beam transverse direction such that the first leg 210, 220 and the second leg 222, 232 intersect at the first wall 160 of the A-pillar 102. In the second reinforcement structure 200 and the third reinforcement structure 202, the first leg 212, 214 and the second leg 224, 230, in respective pairs, are spaced from each other in the first beam longitudinal direction and angled toward each other along the first beam transverse direction such that the first leg 212, 214 and the second leg 224, 230 are spaced from each other at the first wall 160 of the A-pillar 102.

With reference back to FIG. 2, the wheel apron 124 is fixed with the A-pillar 102 through the first bulkhead 182, the second bulkhead 184, and the third bulkhead 190 at a plurality of attachment locations or points including a first attachment location 234, a second attachment location 240, and a third attachment location 242. The first attachment location 234, the second attachment location 240, and the third attachment location 242 are respectively located on the first wall 160 of the A-pillar 102 with the first reinforcement structure 194, the second reinforcement structure 200, and the third reinforcement structure 202. As such, loading from the first bulkhead 182, the second bulkhead 184, and the third bulkhead 190 is directed to the first wall 160 of the A-pillar 102 at the first reinforcement structure 194, the second reinforcement structure 200, and the third reinforcement structure 202.

As shown in FIG. 3, each of the first leg 210, 212, 214, 220 and the second leg 222, 224, 230, 232 in each reinforcement structure 194, 200, 202, 204 includes a first end 244, 250, 252, 254, 260, 262, 264, 270 fixed with the first wall 160 of the A-pillar 102, and a second end 272, 274, 280, 282, 284, 290, 292, 294 fixed with the second wall 162 of the A-pillar 102. The first end 244-270 of each first leg 210, 212, 214, 220 and each second leg 222, 224, 230, 232 is located closer to the first wall 160 of the A-pillar 102 as compared to the second wall 162. The second end 272-294 of each first leg 210, 212, 214, 220 and each second leg 222, 224, 230, 232 is located closer to the second wall 162 of the A-pillar 102 as compared to the first wall 160.

Each attachment location 234, 240, 242 has substantially a same position on the first wall 160 of the A-pillar 102 in the first beam longitudinal direction as at least one of: a first end 244-262 of a first leg 210, 212, 214 or a second leg 222, 224, 230; and a portion of the first wall 160 located between a first end 244, 252, 260 of a first leg 210, 212, 214 and a first end 250, 254, 262 of a second leg 222, 224, 230 of a same reinforcement structure that is one of the first reinforcement structure 194, the second reinforcement structure 200, and the third reinforcement structure 202 in the first beam longitudinal direction. As such, loading from the first bulkhead 182, the second bulkhead 184, and the third bulkhead 190 to the A-pillar 102, as indicated by arrows 300, 302, 304, is respectively directed to the first wall 160 of the A-pillar 102 at a location on or between corresponding first ends 244-262 of the first leg 210, 212, 214 and the second leg 222, 224, 230 of the first reinforcement structure 194, the second reinforcement structure 200, and the third reinforcement structure 202.

In the depicted embodiment, the first attachment location 234 is located on the first end 244 of the first leg 210 of the first reinforcement structure 194. The second attachment location 240 is located on the first end 254 of the second leg 224 of the second reinforcement structure 200. The third attachment location 242 is located on the first end 260 of the first leg 214 of the third reinforcement structure 202.

With continued reference to FIG. 3, the fourth reinforcement structure 204 is positioned at the first wall 160 and the second wall 162 for being located directly behind a wheel assembly housed in the wheel apron 124 in the vehicle longitudinal direction. With this construction, the fourth reinforcement structure 204 reinforces the A-pillar 102 against the wheel assembly under a set of conditions, such as a front-end or offset collision, which deform the wheel assembly backward in the vehicle longitudinal direction, as indicated by an arrow 310.

The side sill 110 includes a side sill reinforcement structure 312 that has similar features and functions in a similar manner as the plurality of first beam reinforcement members 192. The side sill reinforcement structure 312 includes a first strengthening rib or leg 314 and a second strengthening rib or leg 320 disposed along the side sill 110 and extended between the first wall 164 and the second wall 170 of the side sill 110 in the side sill transverse direction. The first leg 314 and the second leg 320 of the side sill reinforcement structure 312 are angled toward each other along the side sill transverse direction in a direction taken from the second wall 170 to the first wall 164 of the side sill 110.

The side sill reinforcement structure 312 is located at a side of the second wall 162 of the A-pillar 102 opposite the first wall 160 of the A-pillar 102 in the side sill longitudinal direction. Also, the side sill end portion 140 is fixed with the A-pillar 102 at the bottom end portion 142, locating the first wall 164 of the side sill 110 with the bottom end portion 142 in the vehicle height direction. As such, the side sill reinforcement structure 312 is positioned on the side sill 110 for being located below the plurality of first beam reinforcement structures 192 in the vehicle height direction, and located behind the plurality of first beam reinforcement structures 192 in the vehicle longitudinal direction. With this construction, the side sill reinforcement structure 312 reinforces the side sill 110 against a moment of force, indicated by an arrow 322, generated in the side sill 110 from forces acting on the A-pillar 102, such as loading from the first bulkhead 182, the second bulkhead 184, and the third bulkhead 190 indicated by the arrows 300, 302, 304, and loading from a wheel assembly indicated by the arrow 310.

With continued reference to FIG. 3, the second A-pillar section 132 defines a first through hole 324 interposed between and separating the second reinforcement structure 200 and the third reinforcement structure 202 along the first beam longitudinal direction. The first through hole 324 is for passage of a vehicle assembly component, and in an embodiment, the first through hole 324 is a wire harness pass-through hole configured for accommodating a wire harness in the A-pillar 102. The second A-pillar section 132 also defines a second through hole 330 located between the first leg 214 and the second leg 230 of the third reinforcement structure 202 in the first beam longitudinal direction. The second through hole 330 is located at a side of the first leg 214 of the third reinforcement structure 202 opposite the first through hole 324 in the first beam longitudinal direction. The second A-pillar section 132 also defines a third through hole 332 located at a side of the third reinforcement structure 202 opposite the first through hole 324 in the first beam longitudinal direction. The third through hole 332 is located at a side of the second leg 220 of the third reinforcement structure 202 opposite the second through hole 330 in the first beam longitudinal direction. The third through hole 332 is interposed between and separates the third reinforcement structure 202 and the fourth reinforcement structure 204 in the first beam longitudinal direction. The second through hole 330 and the third through hole 332 can also be for the passage of vehicle assembly components.

Because the loading indicated by the arrows 300, 302, 304, 310 is directed to the plurality of first beam reinforcement structures 192, the loading is directed through the first legs 210, 212, 214, 220 and the second legs 222, 224, 230, 232 in the plurality of first beam reinforcement structures 192, around the areas of the second A-pillar section 132 defining the first through hole 324, the second through hole 330, and the third through hole 332. In this manner, deformation of the first A-pillar section 130 and the second A-pillar section 132 is controlled through the structural features of the first legs 210, 212, 214, 220 and the second legs 222, 224, 230, 232 in the plurality of first beam reinforcement structures 192. In a similar manner, deformation of the side sill 110 under the loading indicated by the arrow 322 is controlled through the structural features of the side sill reinforcement structure 312.

Figure 4:
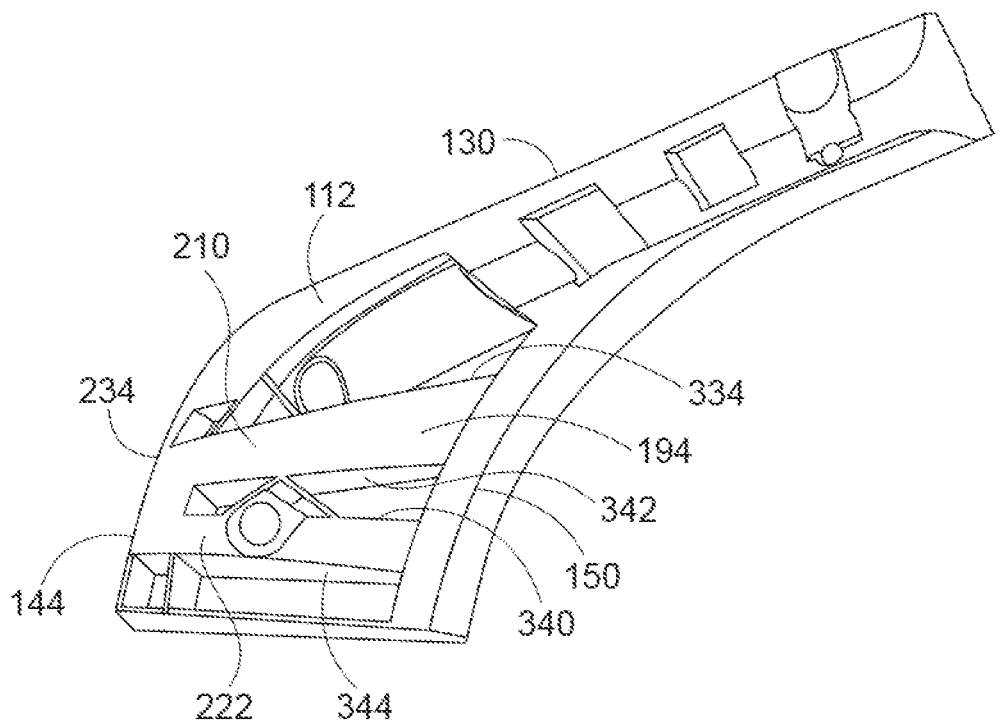
FIG. 4 is an outer side perspective view of a first A-pillar section included in the portion of the vehicle frame.
Figure 5:
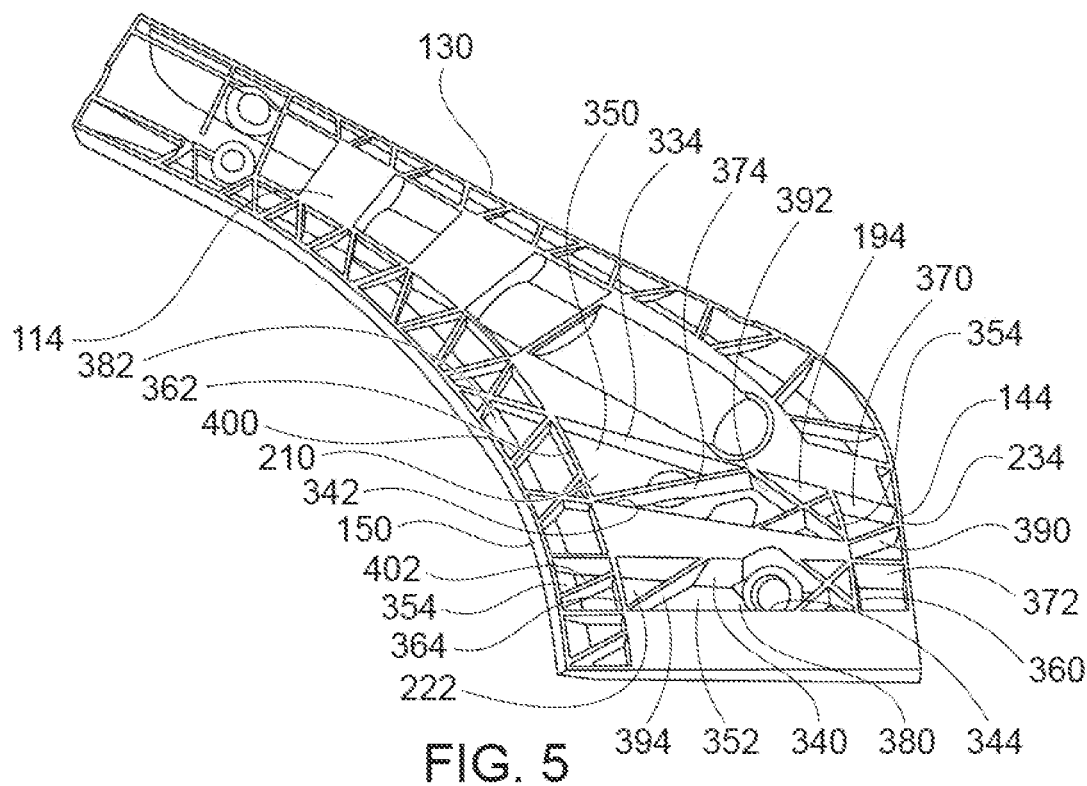
FIG. 5 is an inner side perspective view of the first A-pillar section.

As shown in FIGS. 4 and 5, the first reinforcement structure 194 is integrally formed from the first A-pillar section 130, where the first leg 210 and the second leg 222 extend from the first wall 144 to the second wall 150. The first leg 210 and the second leg 222 of the first reinforcement structure 194 are each respectively formed from a first incline portion 334, 340 and a second incline portion 342, 344 which, as shown in FIG. 5, define a channel 350, 352 across the first A-pillar section 130 in the first beam transverse direction.

With continued reference to FIG. 5, the channels 350, 352 defined in the first leg 210 and the second leg 222 of the first reinforcement structure 194 respectively extend along the first leg 210 and the second leg 222 from the first wall 144 to the second wall 150 of the first A-pillar section 130. While, as depicted, the channels 350, 352 are formed in the first A-pillar section 130 facing the inner side 114 of the vehicle frame 100, the channels 350, 352 may each additionally or alternatively be formed facing the outer side 112 of the vehicle frame 100 without departing from the scope of the present disclosure.

The first leg 210 and the second leg 222 of the first reinforcement structure 194 each respectively include a first partition 354, 360 and a second partition 362, 364 extended substantially in the first beam longitudinal direction, across the channel 350, 352 between the first incline portion 334, 340 and the second incline portion 342, 344. The first partition 354, 360 and the second partition 362, 364 of each channel 350, 352 respectively define a first channel segment 370, 372, a second channel segment 374, 380, and a third channel segment 382, 384 in that order from the first wall 144 toward the second wall 150 of the first A-pillar section 130 in the first beam transverse direction. In each channel 350, 352 the first partition 354, 360 is respectively interposed between and separates the first channel segment 370, 372 and the second channel segment 374, 380, and the second partition 362, 364 is interposed between and separates the second channel segment 374, 380 and the third channel segment 382, 384.

Each first channel segment 370, 372 respectively extends along the channel 350, 352 from the first wall 144 of the first A-pillar section 130 to the first partition 354, 360. Each second channel segment 374, 380 respectively extends along the channel 350, 352 from the first partition 354, 360 to the second partition 362, 364. Each third channel segment 382, 384 respectively extends along the channel 350, 352 from the second partition 362, 364 to the second wall 150 of the first A-pillar section 130. As depicted, the second channel segment 374, 380 in each channel 350, 352 respectively extends a distance in the first beam transverse direction longer than each of the first channel segment 370, 372 and the third channel segment 382, 384.

With continued reference to FIG. 5, the first leg 210 of the first reinforcement structure 194 includes a first rib group 390 with a rib disposed in the first channel segment 370, and extended from the second incline portion 342 toward the first incline portion 334. While, as depicted, the first rib group 390 includes one rib, the first rib group 390 may alternatively include more or fewer ribs without departing from the scope of the present disclosure. Also, while the first channel segment 372 in the second leg 222 does not include a rib disposed therein, the first channel segment 372 in the second leg 222 may alternatively include a first rib group similar to the first rib group 390, having at least one rib disposed therein without departing from the scope of the present disclosure.

Each of the first leg 210 and the second leg 222 of the first reinforcement structure 194 respectively includes a second rib group 392, 394 including at least one rib disposed in the second channel segment 374, 380, and extended from the first incline portion 334, 340 to the second incline portion 342, 344. While, as depicted, the second rib groups 392, 394 each include three ribs, each of the second rib groups 392, 394 may alternatively include more or fewer ribs without departing from the scope of the present disclosure.

Each of the first leg 210 and the second leg 222 of the first reinforcement structure 194 respectively includes a third rib group 400, 402 including at least one rib disposed in the third channel segment 382, 384, and extended from the first incline portion 334, 340 to the second incline portion 342, 344. While, as depicted, the third rib group 400 in the first leg 210 includes two ribs, and the third rib group 402 in the second leg 222 includes one rib, each of the third rib groups 400, 402 may alternatively include more or fewer ribs without departing from the scope of the present disclosure.

The ribs disposed in the first channel segments 370, 372, second channel segments 374, 380, and the third channel segments 382, 384 provide structural support in the first leg 210 and the second leg 222 such that, under a load input from the first attachment location 234, the first channel segments 370, 372 are respectively configured to collapse backward in the vehicle longitudinal direction before the second channel segments 374, 380, and the second channel segments 374, 380 are configured to collapse backward in the vehicle longitudinal direction before the third channel segments 382, 384. As depicted in each of the first leg 210 and the second leg 222 of the first reinforcement structure 194, the second rib group 392, 394 includes more ribs than the first rib group 390 and the first channel segment 370, and includes more ribs than the third rib group 400, 402.

Each rib disposed in the first leg 210 and the second leg 222 of the first reinforcement structure 194 can be oriented diagonally across the corresponding channel 350, 352, forming at least one triangle shape in the channel 350, 352. While, as depicted, only the second rib groups 392, 394 include ribs which intersect each other, each of the first rib groups 390, 392 and the third rib groups 382, 384 may include ribs which intersect each other without departing from the scope of the present disclosure.

Figure 6:
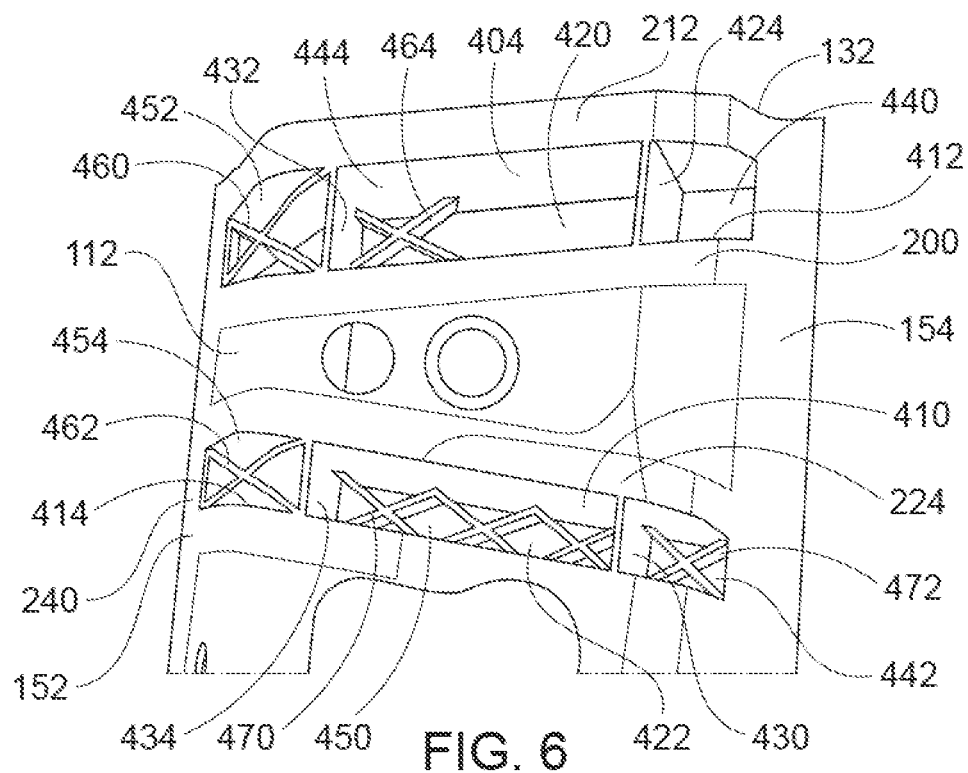
FIG. 6 is a partial outer side perspective view of a second A-pillar section included in the portion of the vehicle frame, including an upper portion of the second A-pillar section.
Figure 7:
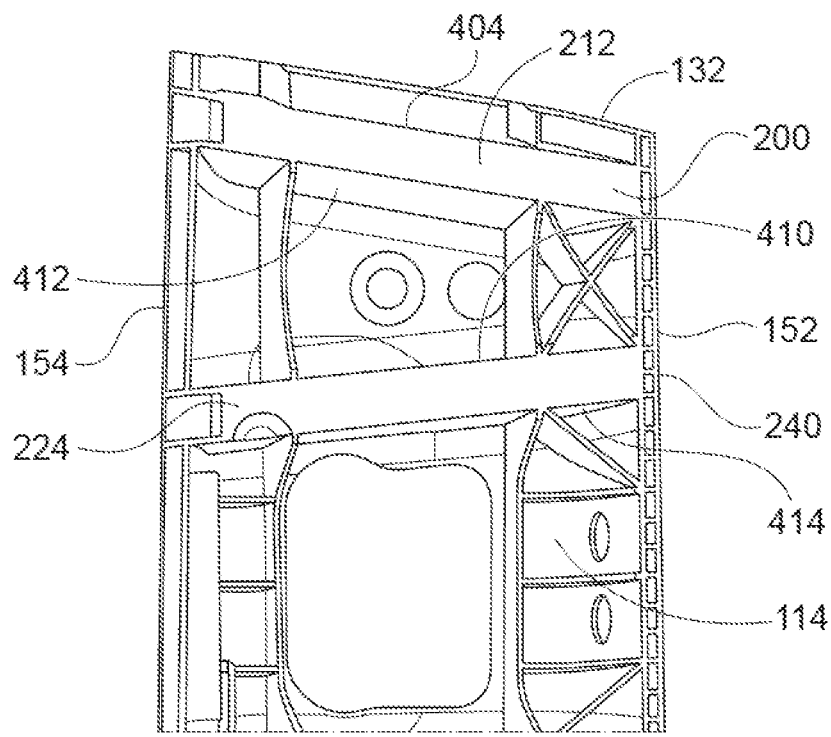
FIG. 7 is a partial inner side perspective view of the second A-pillar section, including the upper portion of the second A-pillar section.

As shown in FIGS. 6 and 7, the second reinforcement structure 200 is integrally formed from the second A-pillar section 132, where the first leg 212 and the second leg 224 extend from the first wall 152 to the second wall 154. The first leg 212 and the second leg 224 of the first reinforcement structure 200 are each respectively formed from a first incline portion 404, 410 and a second incline portion 412, 414 which, as shown in FIG. 6, define a channel 420, 422 across the second A-pillar section 132 in the first beam transverse direction.

With continued reference to FIG. 6, the channels 420, 422 defined in the first leg 212 and the second leg 224 of the second reinforcement structure 200 respectively extend along the first leg 212 and the second leg 224 from the first wall 152 to the second wall 154 of the second A-pillar section 132. While, as depicted, the channels 420, 422 are formed in the second A-pillar section 132 facing the outer side 112 of the vehicle frame 100, the channels 350, 352 may each additionally or alternatively be formed facing the inner side 114 of the vehicle frame 100, similar to the first reinforcement structure 194, without departing from the scope of the present disclosure.

The first leg 212 and the second leg 224 of the second reinforcement structure 200 each respectively include a first partition 424, 430 and a second partition 432, 434 disposed therein, and defining a first channel segment 440, 442, a second channel segment 444, 450, and a third channel segment 452, 454. Each of the first leg 212 and the second leg 222 include a first rib group 460, 462 respectively disposed in the first channel segment 440, 442, a second rib group 464, 470 disposed in the second channel segment 444, 450, and the second leg 222 includes a third rib group 472 disposed in the third channel segment 454.

Unless otherwise stated, the first leg 212 and the second leg 224 of the second reinforcement structure 200 include similar features and function in a similar manner as the first leg 212 and the second leg 222 of the first reinforcement structure 194, including features in the channels 350, 352 such as the first partition 354, 360, the second partition 362, 364, the first rib group 390, the second rib group 392, 394, and the third rib group 400, 402. As shown in FIG. 6, the first rib groups 460, 462 in the second reinforcement structure 200 can each include a plurality of ribs interesting each other in the first channel segment 440, 442, the second rib groups 464, 470 can each include a plurality of ribs intersecting each other in the second channel segment 444, 450, and the third rib group 472 in the second leg 222 can include a plurality of ribs intersecting each other in the third channel segment 454.

The first partition 424, 430 and the second partition 432, 434 in the first leg 212 and the second leg 224 of the second reinforcement structure 200 each extend farther than the second rib group 464, 470, and the third rib group 472 in the second leg 222 in a first beam width direction perpendicular to the first beam longitudinal direction and the first beam transverse direction, from the inner side 114 of the vehicle frame 100 toward the outer side 112. With this construction, the first partition 424, 430 and the second partition 432, 434 in the first leg 212 and the second leg 224 of the second reinforcement structure 200 each provide a structural integrity in the first leg 212 and the second leg 224 configured for enabling successive collapse in the first channel segment 440, 442, the second channel segment 444, 450, and the third channel segment 452, 454 in that order, in response to a load input from the second attachment location 240.

Figure 9:
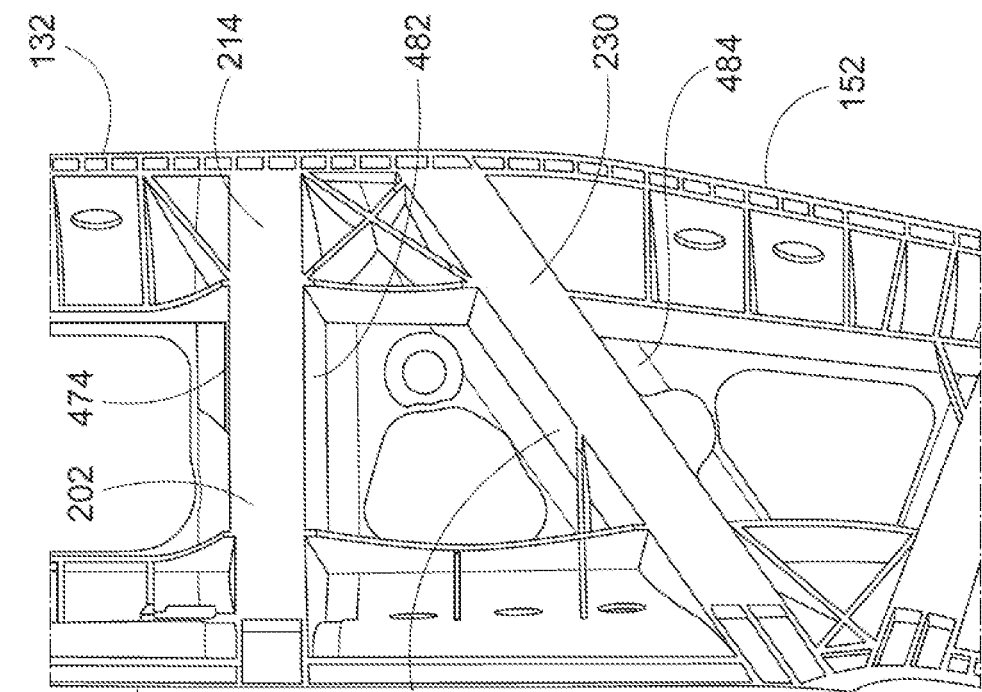
FIG. 9 is a partial inner side perspective view of the second A-pillar section, including the middle portion of the second A-pillar section.
Figure 8:
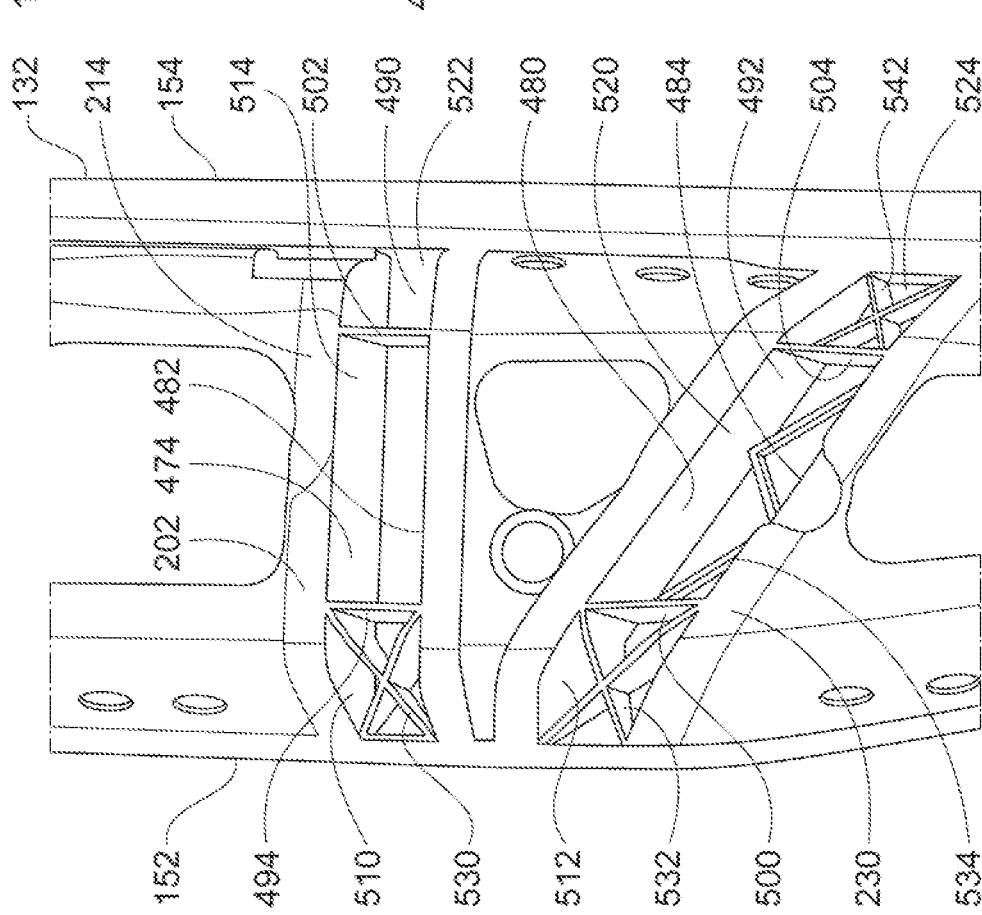
FIG. 8 is a partial outer side perspective view of the second A-pillar section, including a middle portion of the second A-pillar section.

As shown in FIGS. 8 and 9, the third reinforcement structure 202 is integrally formed from the second A-pillar section 132, where the first leg 214 and the second leg 230 extend from the first wall 152 to the second wall 154. The first leg 214 and the second leg 230 of the third reinforcement structure 202 are each respectively formed from a first incline portion 474, 480 and a second incline portion 482, 484 which, as shown in FIG. 8, define a channel 490, 492 across the second A-pillar section 132 in the first beam transverse direction. The channels 490, 492 defined in the first leg 214 and the second leg 230 of the third reinforcement structure 202 respectively extend along the first leg 214 and the second leg 230 from the first wall 152 to the second wall 154 of the second A-pillar section 132.

The first leg 214 and the second leg 230 of the third reinforcement structure 202 each respectively include a first partition 494, 500 and a second partition 502, 504 disposed therein, and defining a first channel segment 510, 512, a second channel segment 514, 520, and a third channel segment 522, 524. Each of the first leg 214 and the second leg 230 include a first rib group 530, 532 respectively disposed in the first channel segment 510, 512. The second leg 230 includes a second rib group 534 disposed in the second channel segment 520, and includes a third rib group 542 disposed in the third channel segment 524.

Unless otherwise stated, the first leg 214 and the second leg 230 of the third reinforcement structure 202 include similar features and function in a similar manner as the first leg 212 and the second leg 224 of the second reinforcement structure 200, including features in the channels 420, 422 such as the first partition 424, 430, the second partition 432, 434, the first rib group 460, 462, the second rib group 464, 470, and the third rib group 472. While, as depicted, the first leg 214 includes the first rib group 530 in the first channel segment 510, the first leg 214 may additionally or alternatively include a second rib group and a third rib group respectively disposed in the second channel segment 514 and the third channel segment 520, similar to the second rib group 534 and the third rib group 542 in the second leg 230.

Figure 11:
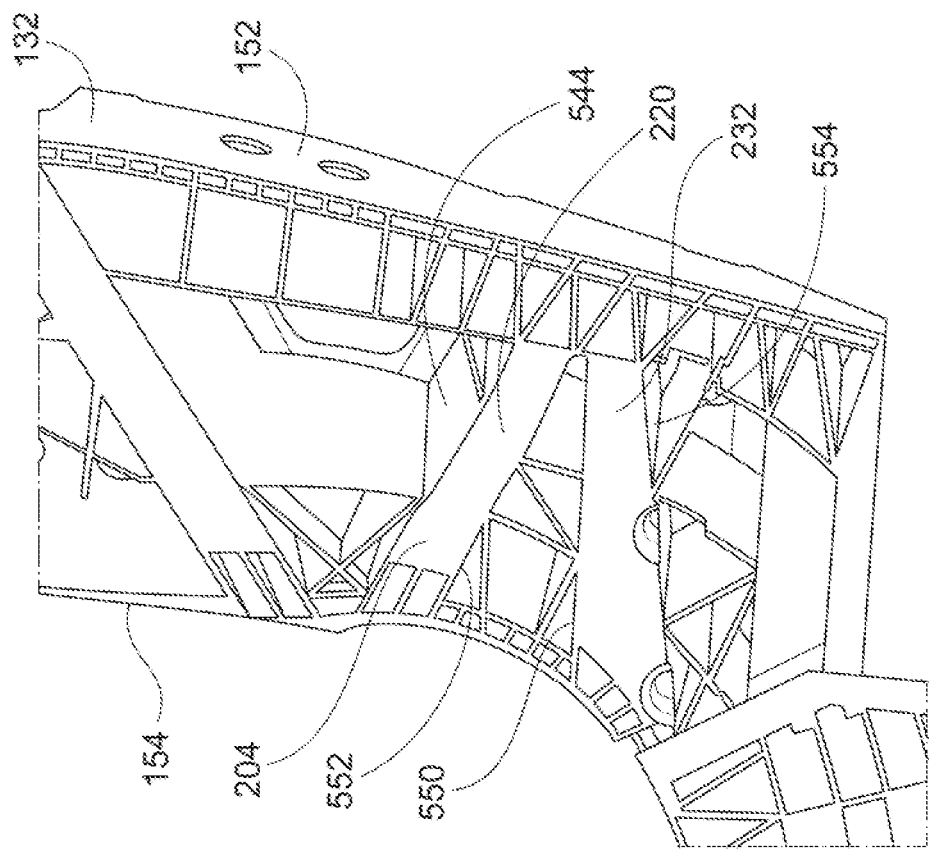
FIG. 11 is a partial inner side perspective view of the second A-pillar section, including the lower portion of the second A-pillar section.
Figure 10:
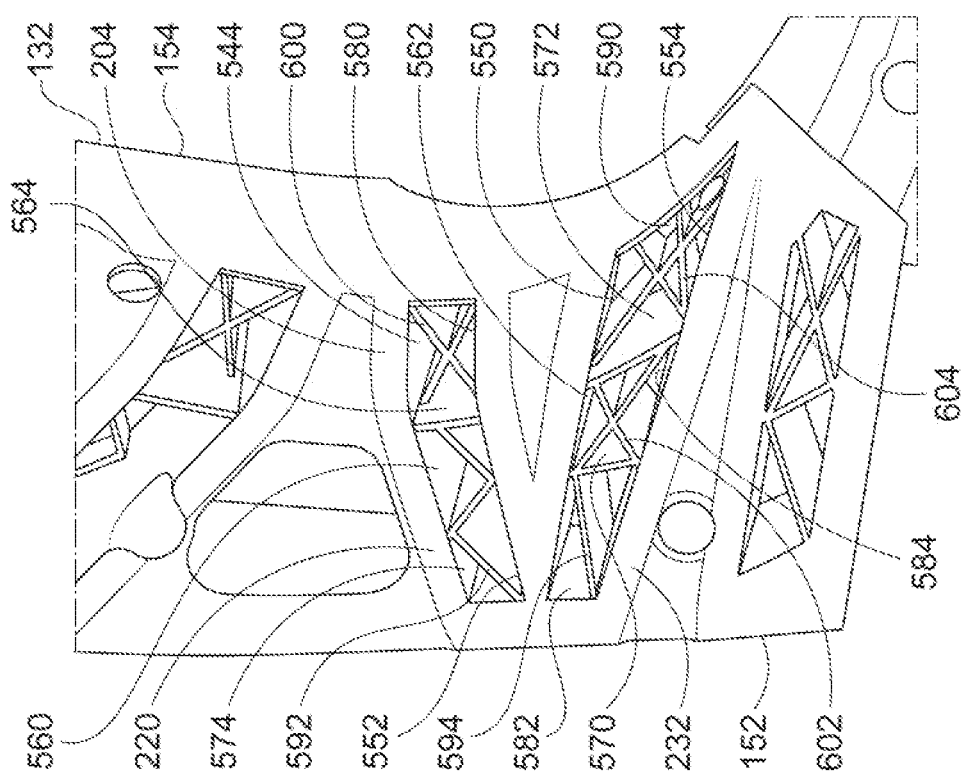
FIG. 10 is a partial outer side perspective view of the second A-pillar section, including a lower portion of the second A-pillar section.

As shown in FIGS. 10 and 11, the fourth reinforcement structure 204 is integrally formed from the second A-pillar section 132, where the first leg 220 and the second leg 232 extend from the first wall 152 to the second wall 154. The first leg 220 and the second leg 232 of the fourth reinforcement structure 204 are each respectively formed from a first incline portion 544, 550 and a second incline portion 552, 554 which, as shown in FIG. 10, define a channel 560, 562 across the second A-pillar section 132 in the first beam transverse direction. The channels 560, 562 defined in the first leg 220 and the second leg 232 of the fourth reinforcement structure 204 respectively extend along the first leg 220 and the second leg 232 from the first wall 152 to the second wall 154 of the second A-pillar section 132.

The first leg 220 and the second leg 232 of the fourth reinforcement structure 204 each respectively include a first partition 564, 570, and the second leg 232 includes a second partition 572 disposed therein. The first partition 564 in the first leg 220 defines a first channel segment 574 and a second channel segment 580 in the channel 560. The first partition 570 and the second partition 572 in the second leg 232 define a first channel segment 582, a second channel segment 584, and a third channel segment 590 in the channel 562. Each of the first leg 220 and the second leg 232 respectively include a first rib group 592, 594 disposed in the first channel segment 574, 582, and a second rib group 600, 602 disposed in the second channel segment 580, 584. The second leg 232 includes a third rib group 604 disposed in the third channel segment 454.

Unless otherwise stated, the first leg 220 and the second leg 232 of the fourth reinforcement structure 204 include similar features and function in a similar manner as the first leg 212 and the second leg 224 of the second reinforcement structure 200, including features in the channels 420, 422 such as the first partition 424, 430, the second partition 432, 434, the first rib group 460, 462, the second rib group 464, 470, and the third rib group 472. While, as depicted, the first leg 220 of the fourth reinforcement structure 204 includes the first partition 564 defining the first channel segment 574 and the second channel segment 580, the first leg 220 may additionally include a second partition further defining a third channel segment in the channel 560, similar to the second partition 572 in the second leg 232, without departing from the scope of the present disclosure.

Figure 12:
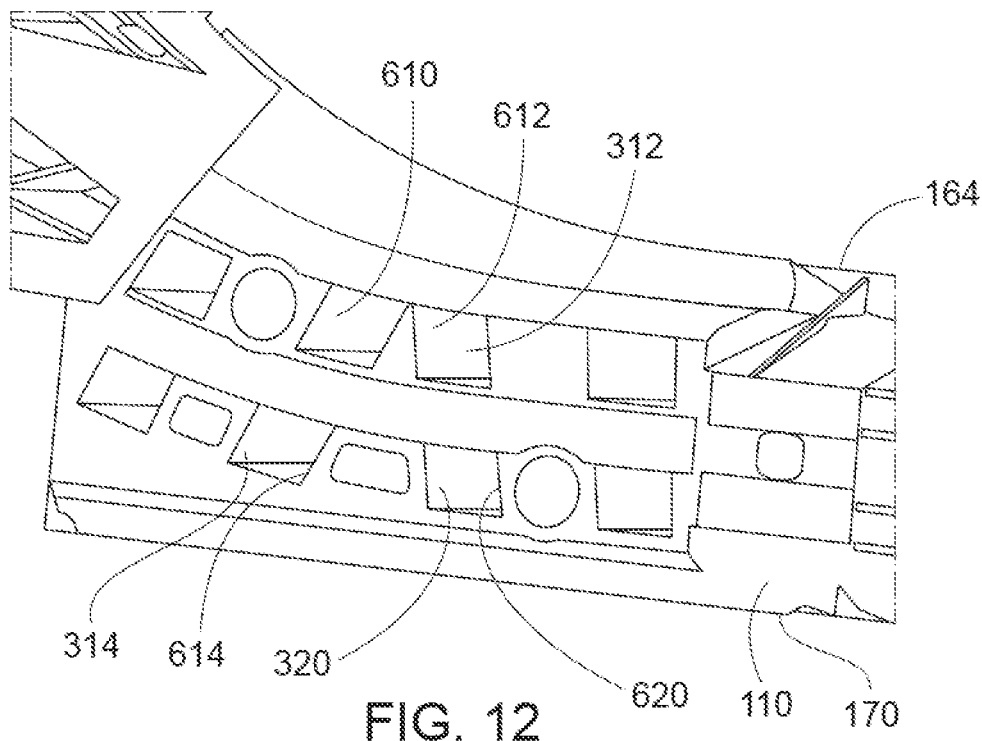
FIG. 12 is a partial outer side perspective view of a side sill included in the portion of the vehicle frame.
Figure 13:
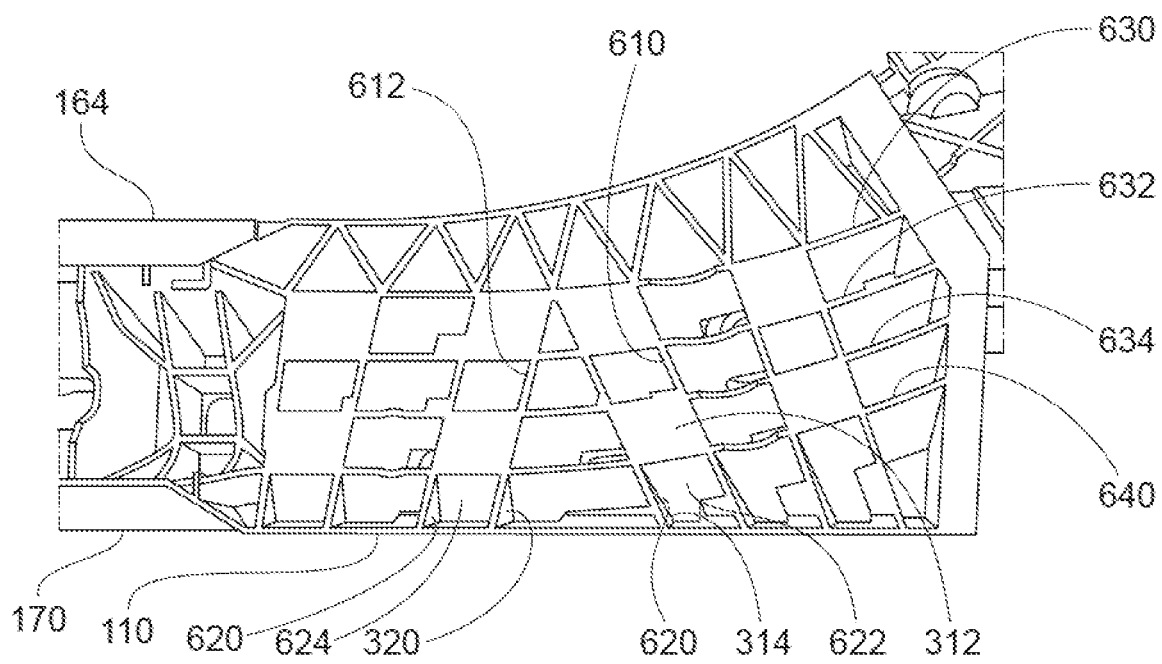
FIG. 13 is a partial inner side perspective view of the side sill.

As shown in FIGS. 12 and 13, the side sill reinforcement structure 312 is integrally formed from the side sill reinforcing member 134, where the first leg 314 and the second leg 320 extend from the first wall 164 to the second wall 170. The first leg 314 and the second leg 320 of the side sill reinforcement structure 312 are each respectively formed from a first incline portion 610, 612 and a second incline portion 614, 620 which, as shown in FIG. 13, define a channel 622, 624 across the side sill 110 in the first beam transverse direction. The channels 622, 624 defined in the first leg 314 and the second leg 320 of the side sill reinforcement structure 312 respectively extend along the first leg 314 and the second leg 320 from the first wall 164 to the second wall 170 of the side sill 110.

The first leg 314 and the second leg 320 of the side sill reinforcement structure 312 are each intersected by a first rib 630, a second rib 632, a third rib 634, and a fourth rib 640 extended in the side sill longitudinal direction. The first rib 630, the second rib 632, the third rib 634, and the fourth rib 640 are spaced from each other in the side sill transverse direction, in that order from the first wall 164 toward the second wall 170 of the side sill 110. The first rib 630, the second rib 632, the third rib 634, and the fourth rib 640 each extend from the first incline portion 610, 612 to the second incline portion 614, 620.

With this construction, the side sill reinforcement structure 312 is configured to have progressive stability in the first leg 314 and the second leg 320 during deformation under loading indicated by the arrow 322 illustrated in FIG. 3. Unless otherwise stated, the first leg 314 and the second leg 320 of the side sill reinforcement structure 312 include similar features and function in a similar manner as the first leg 220 and the second leg 232 of the fourth reinforcement structure 204.

Figure 14:
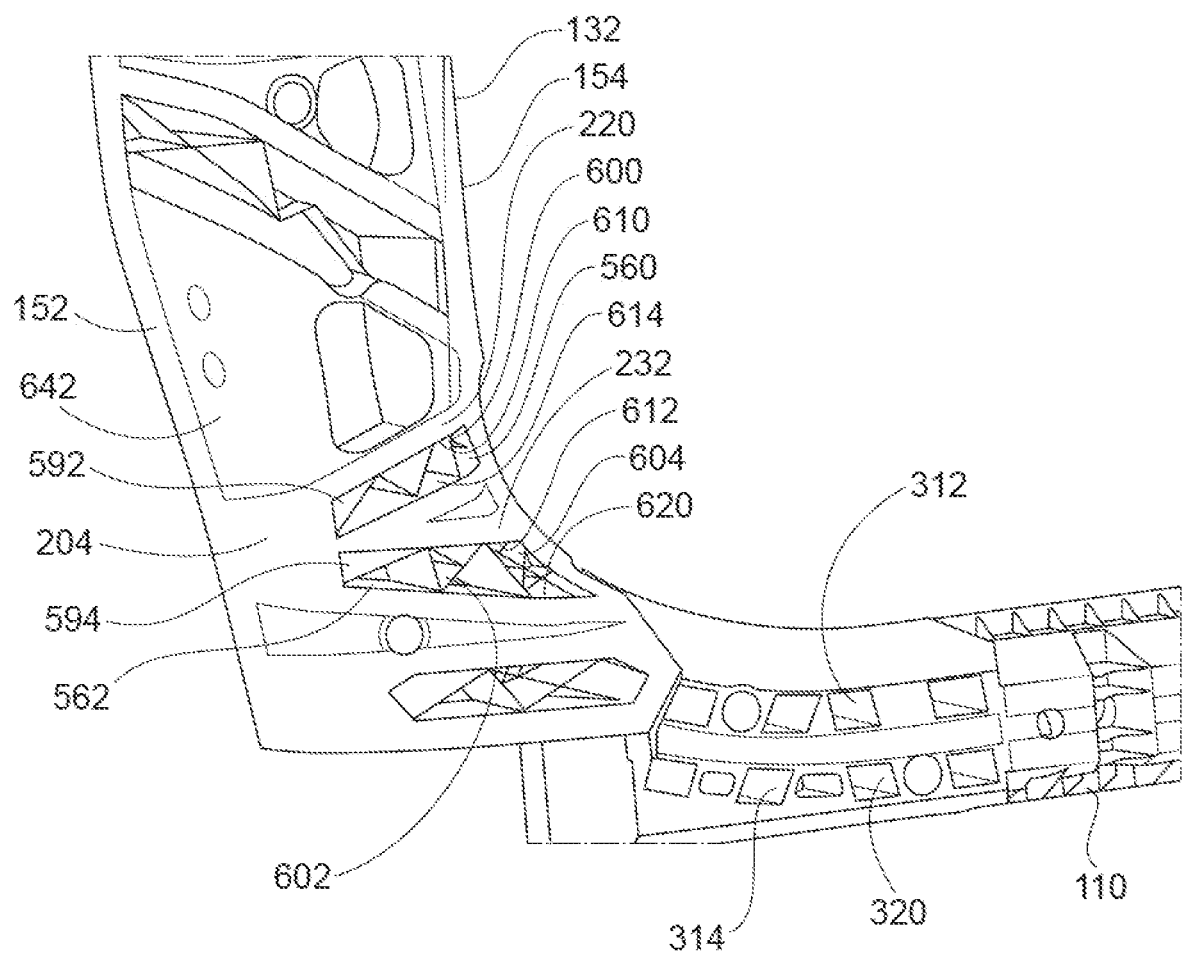
FIG. 14 is a partial perspective view of the portion of the vehicle frame.

As shown in FIG. 14, the first leg 220 and the second leg 232 of the fourth reinforcement structure 204 disrupt a general surface support 642 formed from the second A-pillar section 132 with the first incline portions 610, 612 and the second incline portions 614, 620. The first incline portions 610, 612 and the second incline portions 614, 620 are shear walls configured to convey loading from the first wall 152 toward the second wall 154 of the second A-pillar section 132 along the channels 560, 562, through the first rib group 592, 594, the second rib group 600, 602, and the third rib group 604.

The first leg 220 and the second leg 232 of the fourth reinforcement structure 204 are located above the side sill reinforcement structure 312 in the vehicle height direction, and in front of the side sill reinforcement structure 312 in the vehicle longitudinal direction. The first leg 314 and the second leg 320 of the side sill reinforcement structure 312 are located on the side sill 110 to absorb a moment of force from the second A-pillar 102, including loading from the first leg 220 and the second leg 232 of the fourth reinforcement structure 204.

Figure 15:
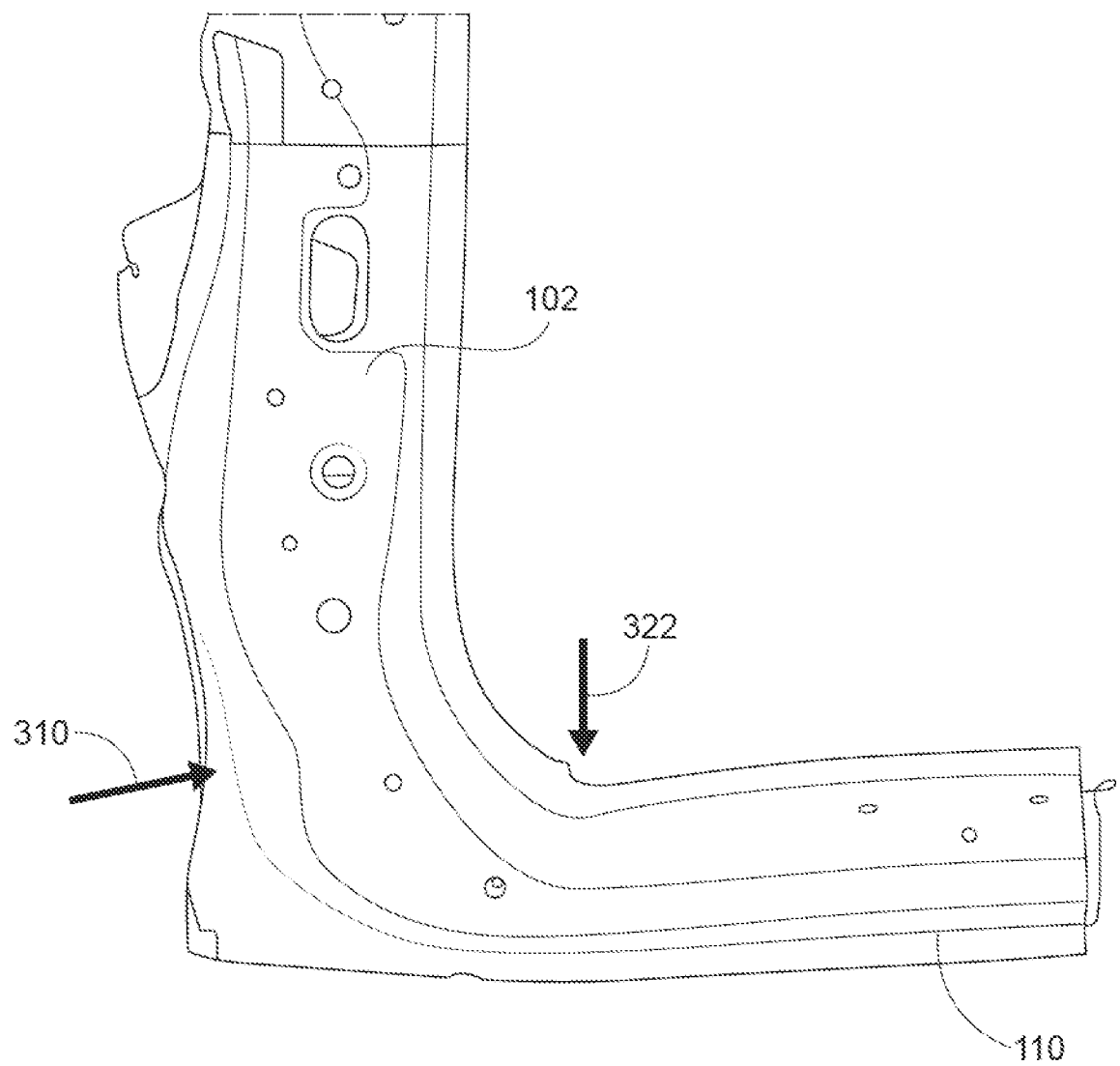
FIG. 15 is a partial side view of a known vehicle body with local deformation due to tire impingement.

The fourth reinforcement structure 204 and the side sill reinforcement structure 312 provide a relative structural integrity between the second A-pillar section 132 at the fourth reinforcement structure 204, and the side sill 110 at the side sill reinforcement structure 312 such that, as shown in FIG. 15, the A-pillar 102 and the side sill 110 similarly deform in a progressive manner indicated by the arrows 310, 322, under loading at the fourth reinforcement structure 204 depicted in FIG. 3. In this manner, the fourth reinforcement structure 204 and the side sill reinforcement structure 312 are configured for cooperatively absorbing energy through deformation under loading on the fourth reinforcement structure 204.

Figure 16:
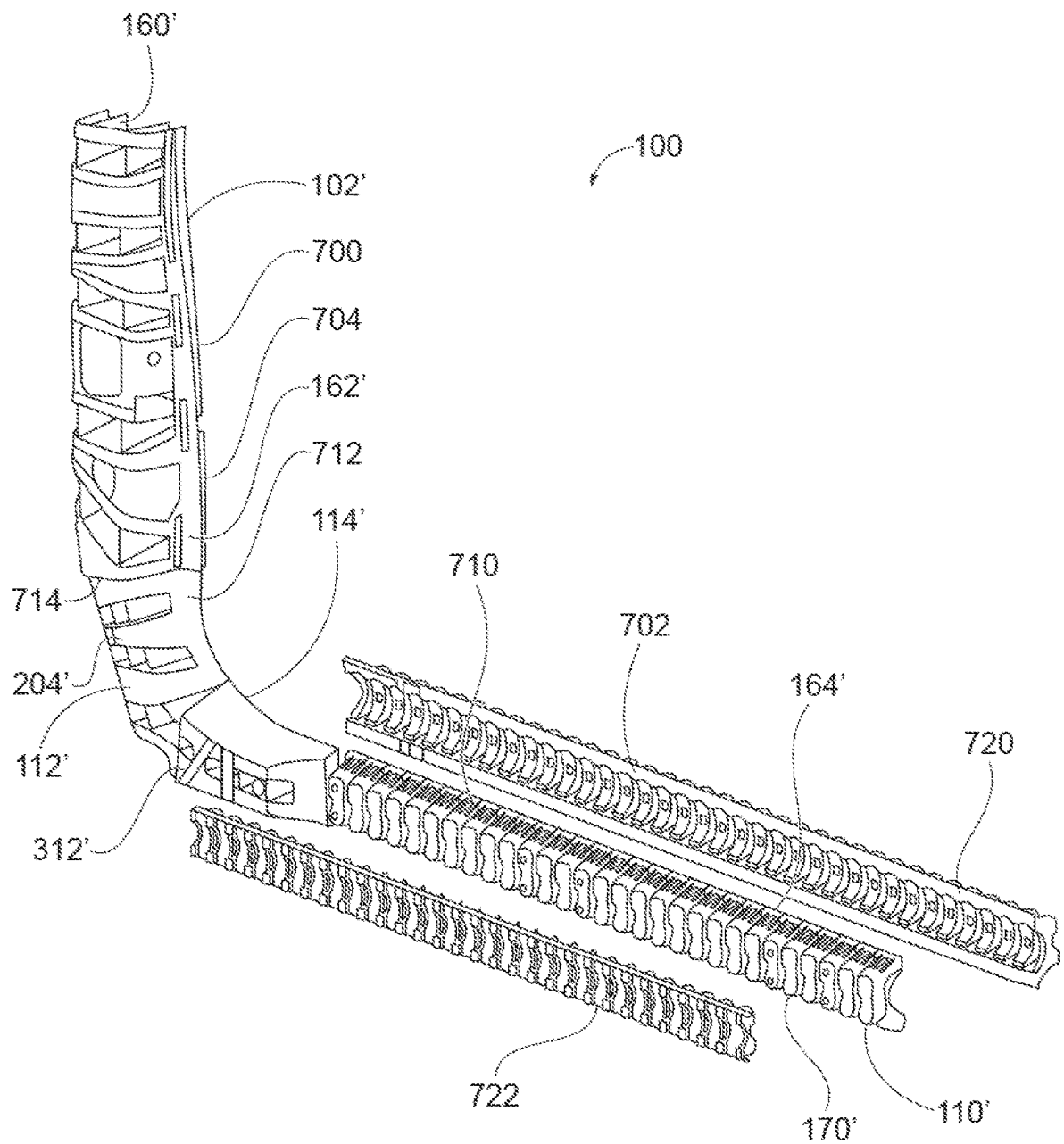
FIG. 16 is an exploded perspective view of an embodiment of a portion of a vehicle frame according to one aspect.
Figure 17:
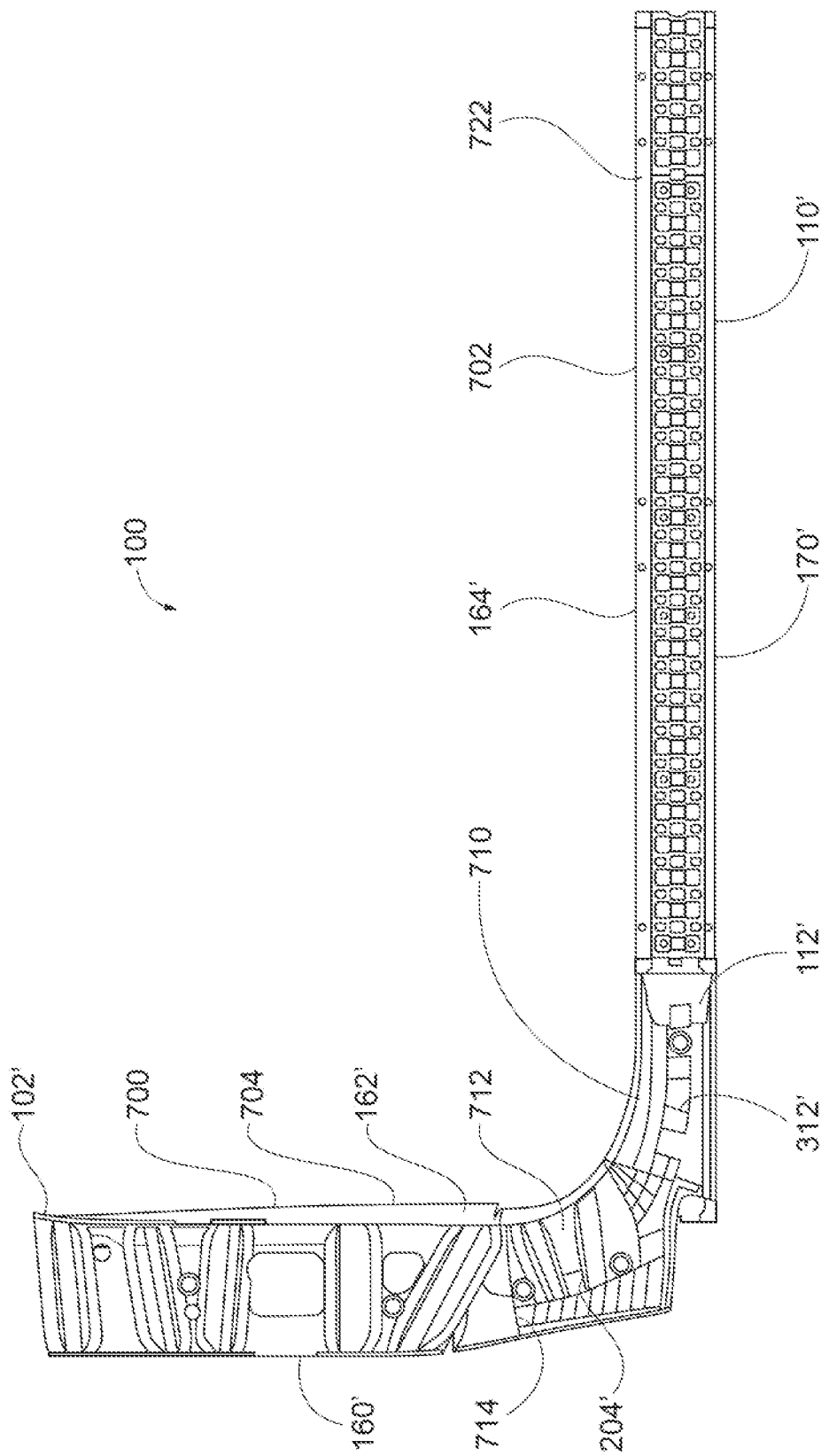
FIG. 17 is an outer side view of the portion of the vehicle frame of FIG. 16.
Figure 18:
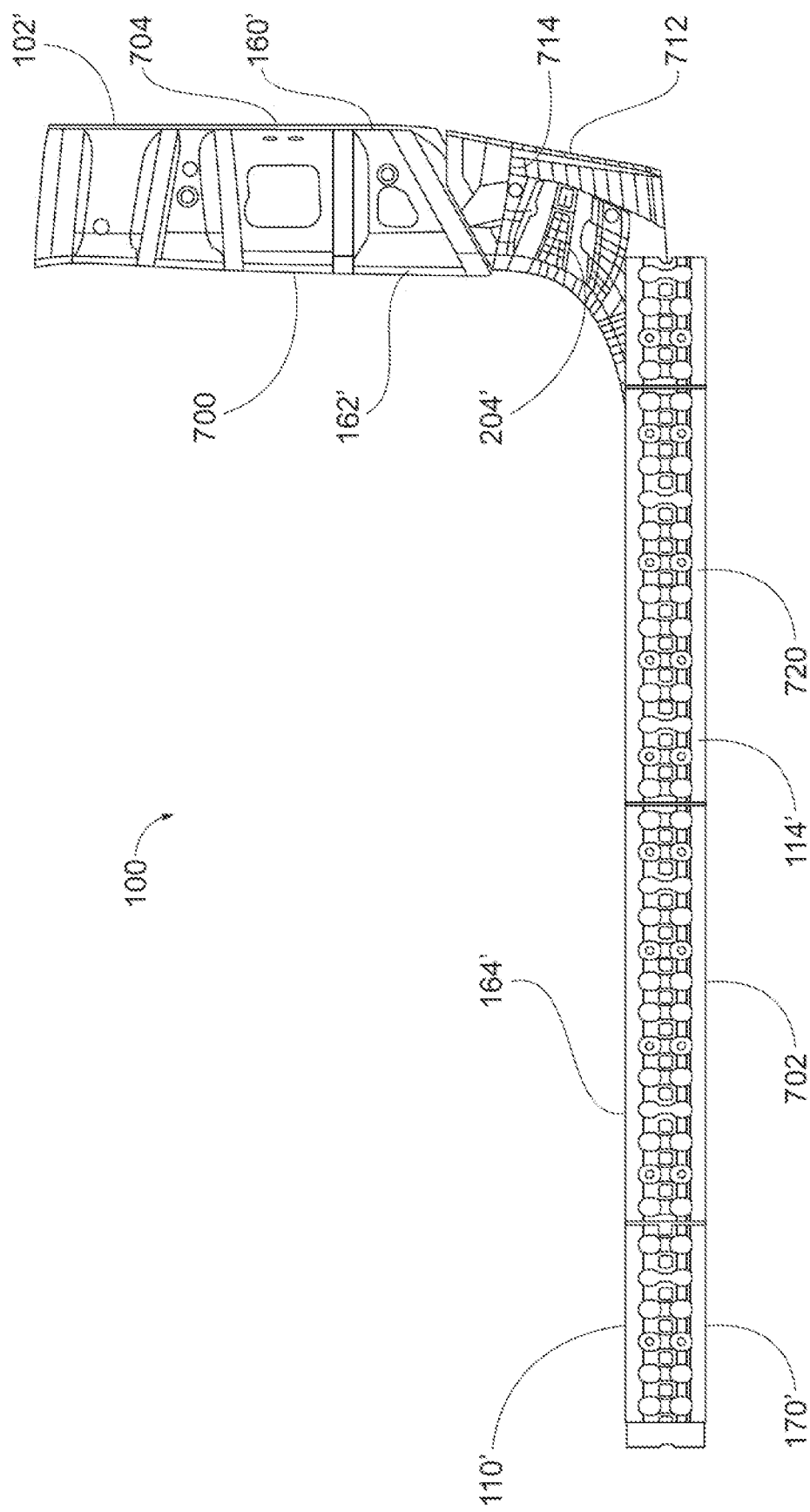
FIG. 18 is an inner side view of the portion of the vehicle frame of FIG. 16.

FIGS. 16-22 depict an alternative embodiment of the vehicle frame 100 of FIGS. 1-15. In the embodiment of FIGS. 16-22, like elements with the vehicle frame of FIGS. 1-15 are denoted with the same reference numerals but followed by a primed suffix ('). FIGS. 16-18 depict the A-pillar 102' and the side sill 110' formed from a first reinforcing member 700 and a second reinforcing member 702. The first reinforcing member 700 forms a portion of a beam in the A-pillar 102' as a first A-pillar section 704. The first reinforcing member 700 forms the first wall 160' and the second wall 162' of the A-pillar 102' extended in the first beam longitudinal direction, and forms the second reinforcement structure 200' and the third reinforcement structure 202' at and between the first wall 160' and the second wall 162', and spaced from each other in the first beam longitudinal direction.

The second reinforcing member 702 is a beam in the vehicle frame 100 fixed with the first reinforcing member 700. The second reinforcing member 702 includes a side sill section 710 and forms the first wall 164' and the second wall 170' of the side sill 110' extended in the side sill longitudinal direction. The side sill section 710 forms the side sill reinforcement structure 312' at and between the first wall 164' and the second wall 170' of the side sill 110', and spaced from each other in the side sill longitudinal direction.

The second reinforcing member 702 includes a second A-pillar section 712 that forms a portion of the beam in the A-pillar 102', including the first wall 160' and the second wall 162' of the A-pillar 102' extended in the first beam longitudinal direction. The second A-pillar section 712 forms the fourth reinforcement structure 204' at and between the first wall 160' and the second wall 162' of the A-pillar 102'. The second A-pillar section 712 is integrally formed with the side sill section 710, and is fixed with a bottom end portion 714 of the first A-pillar section 704.

The second reinforcing member 702 includes an inner side sill reinforcement 720 and an outer side sill reinforcement 722 which are beams that extend along the side sill section 710 in the side sill longitudinal direction. The inner side sill reinforcement 720 and the outer side sill reinforcement 722 are arranged on opposite sides of the side sill section 710 in a side sill width direction such that the inner side sill reinforcement faces the inner side 114' of the vehicle frame 100 from the side sill section 710, and the outer side sill reinforcement faces the outer side 112' of the vehicle frame 100 from the side sill section 710. With this construction, the side sill section 710, the inner side sill reinforcement 720, and the outer side sill reinforcement 722 provide structural reinforcement in the side sill 110' in multiple layers configured to absorb energy under loading in the side sill width direction, such as in a side pole impact of the vehicle frame 100 at the side sill 110'.

Figure 19:
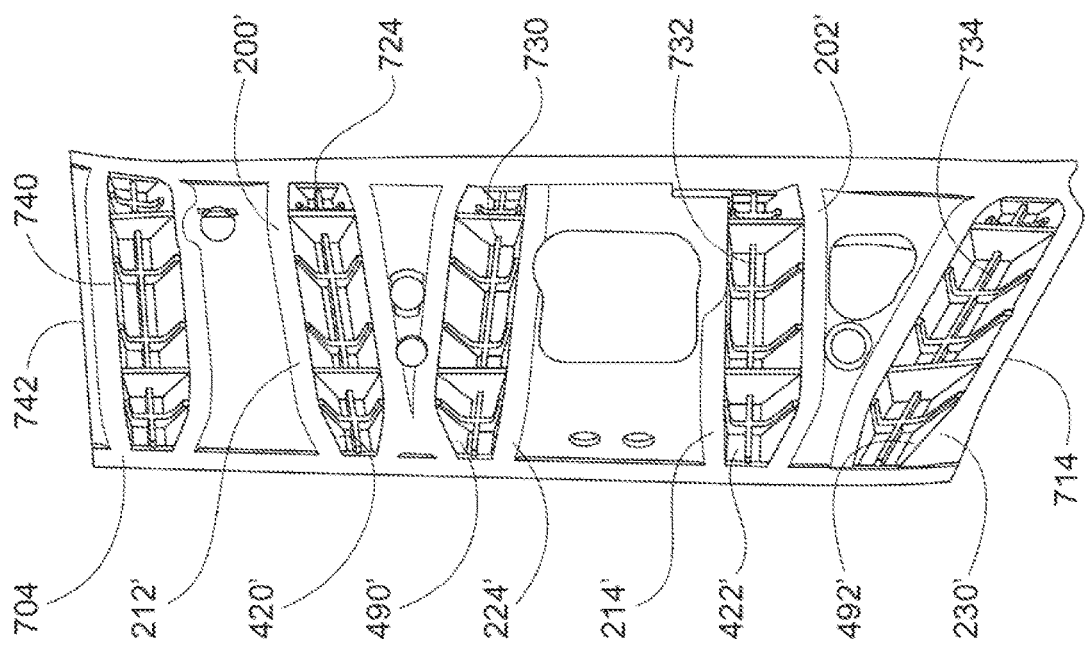
FIG. 19 is a partial outer side view of a first A-pillar section included in the portion of the vehicle frame of FIG. 16.

As shown in FIG. 19, the second reinforcement structure 200' and the third reinforcement structure 202' respectively include a plurality of ribs 724, 730, 732, 734 in the first leg and the second leg. Ribs in each plurality of ribs 724, 730, 732, 734 respectively intersect each other in the channel 420', 422', 490', 492' of the first leg 212', 214' and the second leg 224', 230' of the second reinforcement structure 200' and the third reinforcement structure 202'. As depicted, each plurality of ribs 724, 730, 732, 734 is disposed in a grid pattern, however, each plurality of ribs 724, 730, 732, 734 may additionally or alternatively by provided in another intersecting or non-intersecting pattern without departing from the scope of the present disclosure.

Figure 20:
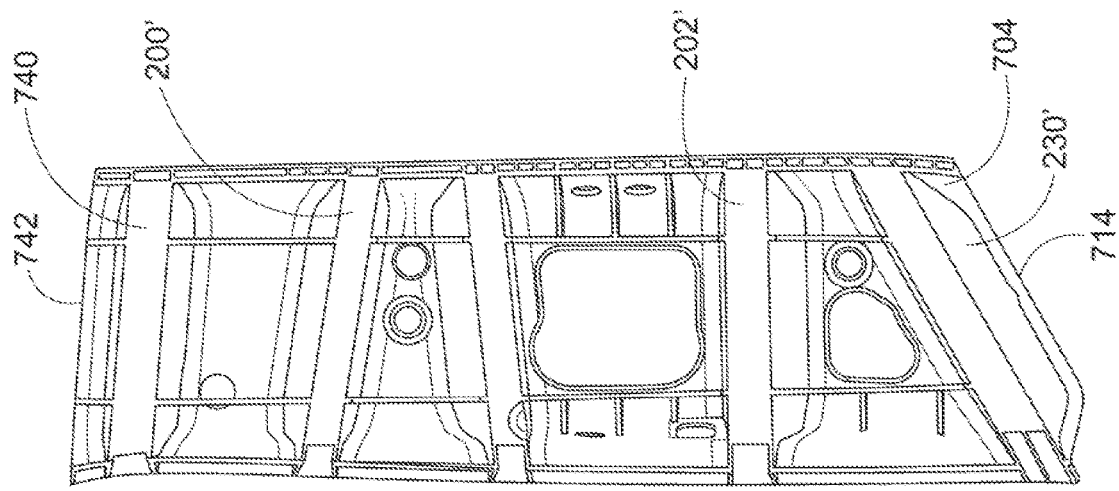
FIG. 20 is a partial inner side view of the first A-pillar section included in the portion of the vehicle frame of FIG. 16.

As shown in FIGS. 19 and 20, the second leg 230' of the third reinforcement structure 202' is disposed along the bottom end portion 714, and an upper end portion leg 740 is disposed along an upper end portion 742 in the first beam transverse direction. With this construction, second leg 230' of the third reinforcement structure 202' and the upper end portion leg 740 respectively provide structural integrity to the first A-pillar section 704 at the bottom end portion 714 and the upper end portion 742.

As shown in FIG. 21, the first leg 220' and the second leg 232' of the fourth reinforcement structure 204' each include a plurality of ribs 744, 750 disposed in the channel 560', 562'. Ribs in each plurality of ribs 744, 750 respectively intersect each other in the channel 560', 562' of the first leg 220' and the second leg 232'. As depicted, each plurality of ribs 744, 750 is disposed in a grid pattern, however, each plurality of ribs 744, 750 may additionally or alternatively by provided in another intersecting or non-intersecting pattern without departing from the scope of the present disclosure.

Figure 22:
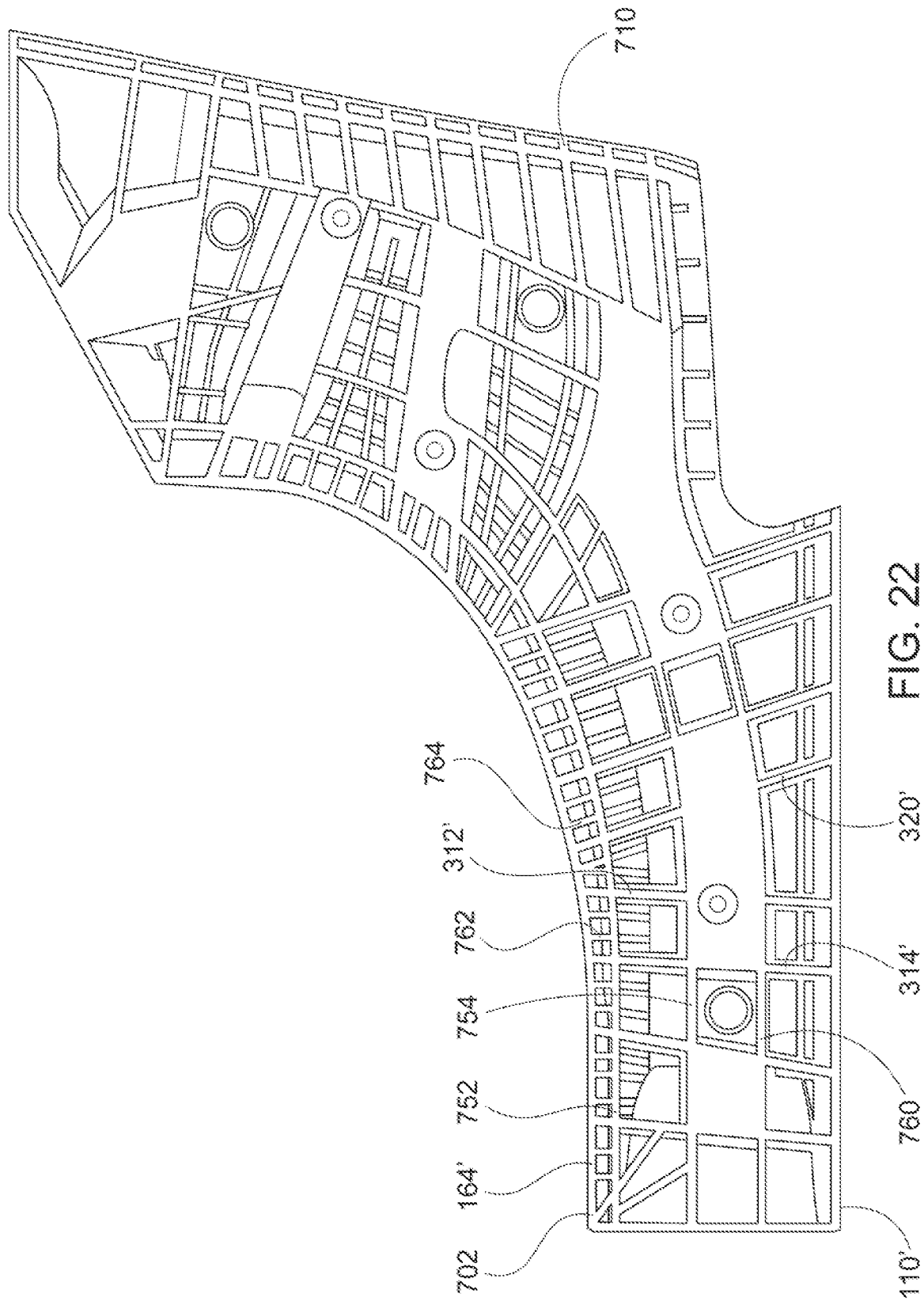
FIG. 22 is a partial inner side view of the second A-pillar section and the side sill included in the portion of the vehicle frame of FIG. 16.

As shown in FIG. 22, the side sill section 710 of the second reinforcing member 702 includes a first rib 752, a second rib 754, and a third rib 760 extending in the side sill longitudinal direction, and intersecting the first leg 314' and the second leg 320' of the side sill reinforcement structure 312'. The first rib 752 is spaced from the first wall 164' of the side sill 110' in the side sill transverse direction. The side sill reinforcement structure 312' includes a plurality of ribs 762, 764 disposed between the first wall 164' of the side sill 110' and the first rib 752, in each of the first leg 314' and the second leg 320'. The ribs 762, 764 disposed between the first wall 164' of the side sill 110' and the first rib 752 form a foundation configured to provide stability in the side sill reinforcement structure 312' during deformation under loading.

It will be appreciated that aspects of the above-disclosed embodiments and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle frame comprising:
a first beam with a first wall and a second wall extended in a first beam longitudinal direction, wherein the first wall and the second wall are spaced from each other in a first beam transverse direction substantially perpendicular to the first beam longitudinal direction; and
wherein the first beam includes at least one first beam reinforcement structure, the at least one first beam reinforcement structure including a first leg and a second leg disposed along the first beam and extended between the first wall and the second wall in the first beam transverse direction, wherein the first leg and the second leg are angled toward each other along the first beam transverse direction from the second wall toward the first wall,
wherein at least one of the first leg and the second leg are angled toward each other such that respective end portions of the first leg and the second leg intersect at the first wall, and the first leg and the second leg are angled toward each other such that respective end portions of the first leg and the second leg are spaced from each other at the first wall.

2. The vehicle frame of claim 1, wherein at least one of the first leg and the second leg includes a first incline portion and a second incline portion which define a channel across the first beam in the first beam transverse direction, along the at least one of the first leg and the second leg.

3. The vehicle frame of claim 1, further comprising a second beam fixed with the first beam at an attachment location on the first wall, and wherein the attachment location has substantially a same position on the first wall in the first beam longitudinal direction as the at least one first beam reinforcement structure along the first wall.

4. The vehicle frame of claim 3, wherein the second beam includes a shear wall extended substantially along the first beam transverse direction, and the vehicle frame further comprises a bulkhead directly connecting the shear wall to the attachment location on the first wall.

5. The vehicle frame of claim 3, wherein the at least one first beam reinforcement structure includes a plurality of first beam reinforcement structures wherein each reinforcement structure in the plurality includes a first leg and a second leg disposed along the first beam between the first wall and the second wall of the first beam in the first beam transverse direction, and the second beam is fixed with the first beam at a plurality of attachment locations located on the first wall of the first beam, wherein each attachment location has substantially a same position on the first wall in the first beam longitudinal direction as a first beam reinforcement structure in the plurality of first beam reinforcement structures.

6. The vehicle frame of claim 5, wherein the first beam defines:
a first through hole interposed between and separating reinforcement structures included in the plurality of first beam reinforcement structures along the first beam longitudinal direction,
a second through hole located between the first leg and the second leg of a reinforcement structure included in the plurality of first beam reinforcement structures, and at a side of the first leg of the reinforcement structure opposite the first through hole in the first beam longitudinal direction, and
a third through hole located at a side of the reinforcement structure included in the plurality of first beam reinforcement structures opposite the first through hole, and at a side of the second leg of the reinforcement structure opposite the second through hole in the first beam longitudinal direction.

7. The vehicle frame of claim 3, wherein the first beam is an A-pillar, wherein the first wall and the second wall of the first beam extend in a vehicle height direction such that the first wall is located in front of the second wall in a vehicle longitudinal direction, and
wherein the second beam is a wheel apron extended in the vehicle longitudinal direction.

8. The vehicle frame of claim 1, wherein at least one of the first leg and the second leg includes a first incline portion and a second incline portion which define a channel extended along the at least one of the first leg and the second leg in the first beam transverse direction, and includes at least one partition extended substantially in the first beam longitudinal direction, across the channel between the first incline portion and the second incline portion.

9. The vehicle frame of claim 1, wherein the first leg and the second leg are linear and at least partially define a triangle shape in the first beam between the first leg, the second leg, and the second wall.

10. The vehicle frame of claim 1, further comprising:
a side sill having a side sill end portion fixed with the first beam, the side sill including a first wall and a second wall extended in a side sill longitudinal direction, and spaced from each other in a side sill transverse direction substantially perpendicular to the side sill longitudinal direction, wherein the first beam longitudinal direction is substantially perpendicular to the side sill longitudinal direction,
wherein the side sill includes a side sill reinforcement structure, the side sill reinforcement structure including a first leg and a second leg disposed along the side sill and extended between the first wall and the second wall of the side sill substantially in the side sill transverse direction, wherein the first leg and the second leg are angled toward each other along the side sill transverse direction in a direction taken from the second wall to the first wall, wherein the side sill reinforcement structure is located at a side of the second wall opposite the first wall in the side sill longitudinal direction.

11. A vehicle frame, comprising:
an A-pillar including a first wall and a second wall extended in a vehicle height direction and spaced from each other such that the first wall is positioned in front of the second wall in a vehicle longitudinal direction,
wherein the A-pillar includes an first beam reinforcement structure positioned at the first wall and the second wall, the first beam reinforcement structure including a first leg and a second leg disposed along the A-pillar between the first wall and the second wall in the vehicle longitudinal direction, wherein the first leg and the second leg of the first beam reinforcement structure are angled toward each other along the vehicle longitudinal direction from the second wall toward the first wall of the A-pillar,
wherein at least one of the first leg and the second leg are angled toward each other such that respective end portions of the first leg and the second leg intersect at the first wall, and the first leg and the second leg are angled toward each other such that respective end portions of the first leg and the second leg are spaced from each other at the first wall.

12. The vehicle frame of claim 11, further comprising:
a side sill fixed with the A-pillar, wherein the side sill includes a first wall and a second wall extended in the vehicle longitudinal direction and spaced from each other such that the first wall is positioned above the second wall in the vehicle height direction,
wherein the side sill includes a side sill reinforcement structure fixed with the side sill for being located below the first beam reinforcement structure in the vehicle height direction, and located behind the first beam reinforcement structure in the vehicle longitudinal direction, wherein the side sill reinforcement structure includes a first leg and a second leg disposed along the side sill between the first wall and the second wall of the side sill in the vehicle height direction, wherein the first leg and the second leg of the side sill reinforcement structure are angled toward each other along the vehicle height direction from the second wall toward the first wall of the side sill.

13. A vehicle frame comprising:
a beam with a first wall and a second wall extended in a beam longitudinal direction, wherein the first wall and the second wall are spaced from each other in a beam transverse direction substantially perpendicular to the beam longitudinal direction,
wherein the beam includes a reinforcement structure with at least one leg formed from a first incline portion and a second incline portion disposed along the beam, between the first wall and the second wall in the beam transverse direction, wherein the first incline portion and the second incline portion define a channel in the at least one leg extended along the at least one leg in the beam transverse direction.

14. The vehicle frame of claim 13, further comprising a first partition and a second partition extended substantially in the beam longitudinal direction, across the channel between the first incline portion and the second incline portion, wherein the first partition and the second partition define a first channel segment, a second channel segment, and a third channel segment in that order from the first wall toward the second wall in the beam transverse direction, wherein the first partition is interposed between and separates the first channel segment and the second channel segment, and the second partition is interposed between and separates the second channel segment and the third channel segment.

15. The vehicle frame of claim 14, further comprising:
a first rib group including at least one rib disposed in the first channel segment, and extended from the first incline portion to the second incline portion in the beam longitudinal direction;
a second rib group including at least one rib disposed in the second channel segment, and extended from the first incline portion to the second incline portion in the beam longitudinal direction; and
a third rib group including at least one rib disposed in the third channel segment, and extended from the first incline portion to the second incline portion in the beam longitudinal direction.

16. The vehicle frame of claim 15, wherein the second rib group includes more ribs than each of the first rib group and the third rib group, and wherein the second channel segment extends a distance in the beam transverse direction longer than each of the first channel segment and the third channel segment.

17. The vehicle frame of claim 15, wherein the first rib group includes a plurality of ribs interesting each other in the first channel segment, the second rib group includes a plurality of ribs intersecting each other in the second channel segment, and the third rib group includes a plurality of ribs intersecting each other in the third channel segment.

18. The vehicle frame of claim 14, further comprising at least one rib disposed in the channel, wherein the first partition and the second partition each extend further than the at least one rib in a beam width direction perpendicular to the beam longitudinal direction and the beam transverse direction.

* * * * *